US011785645B2

(12) United States Patent
Zhang et al.

(10) Patent No.: US 11,785,645 B2
(45) Date of Patent: *Oct. 10, 2023

(54) RANDOM ACCESS COVERAGE EXTENSION IN WIRELESS COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Zhifei Fan, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/320,016

(22) Filed: May 13, 2021

(65) Prior Publication Data

US 2021/0266986 A1    Aug. 26, 2021

Related U.S. Application Data

(63) Continuation of application No. 16/263,887, filed on Jan. 31, 2019, now Pat. No. 11,147,102.
(Continued)

(51) Int. Cl.
*H04L 27/26* (2006.01)
*H04W 74/08* (2009.01)
(Continued)

(52) U.S. Cl.
CPC ...... *H04W 74/0833* (2013.01); *H04B 17/327* (2015.01); *H04L 27/0014* (2013.01);
(Continued)

(58) Field of Classification Search
CPC ..... H04W 72/04; H04W 88/08; H04W 76/00; H04W 74/0833; H04L 27/2666;
(Continued)

(56) References Cited

U.S. PATENT DOCUMENTS 9,426,828 B1 *   8/2016   Singh ................... H04W 72/08
2013/0286958 A1 * 10/2013   Liang ................ H04W 74/0833
                                                        370/329
(Continued)

OTHER PUBLICATIONS

International Preliminary Report on Patentability—PCT/US2019/028286, The International Bureau of WIPO—Geneva, Switzerland, dated Nov. 5, 2020.
(Continued)

*Primary Examiner* — Hassan A Phillips
*Assistant Examiner* — Prenell P Jones
(74) *Attorney, Agent, or Firm* — Holland & Hart LLP

(57) ABSTRACT

Methods, systems, and devices for wireless communications are described that provide for aggregating random access requests across two or more physical random access channel (PRACH) occasions. Poor channel quality may inhibit the receipt of random access requests, and for user equipments (UEs) located in areas with relatively poor coverage, such aggregated random access requests may have an increased likelihood of successful receipt at a base station. The base station may configure a number of PRACH occasions to be available for aggregation of random access requests. A UE may receive PRACH configuration information from the base station, may aggregate a random access request across two or more PRACH occasions using the PRACH configuration information, and may transmit the aggregated random access request via the PRACH occasions. The base station may also configure one or more PRACH occasions to have a smaller subcarrier spacing for transmission of a random access request.

30 Claims, 18 Drawing Sheets

Related U.S. Application Data

(60) Provisional application No. 62/661,475, filed on Apr. 23, 2018.

(51) Int. Cl.
   *H04B 17/327* (2015.01)
   *H04L 27/00* (2006.01)

(52) U.S. Cl.
   CPC ...... *H04L 27/2618* (2013.01); *H04L 27/2666* (2013.01); *H04L 2027/0095* (2013.01)

(58) Field of Classification Search
   CPC ............. H04L 27/0014; H04L 27/2618; H04L 2027/0095; H04B 17/327
   See application file for complete search history.

(56) References Cited

U.S. PATENT DOCUMENTS

| | | | |
|---|---|---|---|
| 2015/0016312 A1 | 1/2015 | Li et al. | |
| 2015/0163829 A1 | 6/2015 | Li et al. | |
| 2015/0304080 A1 | 10/2015 | Yi et al. | |
| 2017/0164350 A1 | 6/2017 | Sun et al. | |
| 2018/0077696 A1 | 3/2018 | Lee et al. | |
| 2018/0097541 A1 | 4/2018 | Bhattad et al. | |
| 2018/0160448 A1 | 6/2018 | Blankenship et al. | |
| 2018/0184461 A1* | 6/2018 | Zhang | H04W 72/14 |
| 2018/0235013 A1* | 8/2018 | Jung | H04W 74/006 |
| 2018/0302829 A1* | 10/2018 | Yavuz | H04W 36/0077 |
| 2019/0110314 A1 | 4/2019 | Abedin et al. | |
| 2019/0116613 A1 | 4/2019 | Abedin et al. | |
| 2019/0191454 A1 | 6/2019 | Blankenship et al. | |
| 2019/0313371 A1 | 10/2019 | Papasakellariou et al. | |
| 2019/0327766 A1 | 10/2019 | Zhang et al. | |
| 2019/0386737 A1 | 12/2019 | Liu et al. | |
| 2020/0107235 A1* | 4/2020 | Peisa | H04W 24/08 |
| 2020/0178318 A1* | 6/2020 | Yu | H04W 74/08 |
| 2020/0329503 A1 | 10/2020 | Da Silva et al. | |

OTHER PUBLICATIONS

International Search Report and Written Opinion—PCT/US2019/028286—ISA/EPO—dated Jun. 21, 2019.
ZTE et al., "Remaining Details of RACH Procedure", 3GPP Draft; R1-1719346, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27, 2017-Dec. 1, 2017, Nov. 18, 2017 (Nov. 18, 2017), XP051369275, 30 Pages, Retrieved from the Internet: URL:http://www.3gpp.org/ftp/tsg%5Fran/WG1%5FRL1/TSGR1%5F91/Docs/ [retrieved on Nov. 18, 2017], Figures 1-14, Sections 2-10, Section 8, Sections 7.2-7.5, 7.8-7.11; p. 7-p. 18.
CATT: "Further Details on NR RACH Format", 3GPP TSG RAN WG1 Meeting #90bis, R1-1717802, 3rd Generation Partnership Project, Mobile Competence Centre, 650, Route Des Lucioles, F-06921 Sophia-Antipolis Cedex, France vol. RAN WG1, No. Prague, CZ, Oct, 9, 2017-Oct. 13, 2017, Oct. 8, 2017, 11 Pages, XP051340987.

* cited by examiner

RANDOM ACCESS COVERAGE EXTENSION IN WIRELESS COMMUNICATIONS

CROSS REFERENCES

The present application for patent is a Continuation of U.S. patent application Ser. No. 16/263,887 by ZHANG et al., entitled "RANDOM ACCESS COVERAGE EXTENSION IN WIRELESS COMMUNICATIONS" and filed Jan. 31, 2019, which claims the benefit of U.S. Provisional Patent Application No. 62/661,475 by ZHANG et al., entitled "RANDOM ACCESS COVERAGE EXTENSION IN WIRELESS COMMUNICATIONS" and filed Apr. 23, 2018, each of which is assigned to the assignee hereof and expressly incorporated herein.

BACKGROUND

The following relates generally to wireless communications, and more specifically to random access coverage extension in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may use wireless resources (e.g., time resources, frequency resources, spatial resources, or combinations thereof) for random access procedures to initiate connections between a UE and a base station. The random access procedures may include a contention based random access procedure where a device must contend for the channel before attempting access or a contention free random access procedure where resources are preconfigured for the device. In some cases, the random access procedures may be performed using wireless resources configured for a physical random access channel (PRACH) and may involve exchanging one or more random access channel (RACH) signals, e.g., a RACH message 1 (msg1) which may be referred to as a random access request, RACH message 2 (msg2), and the like. A random access request may include a random access sequence or preamble that is transmitted to a base station.

SUMMARY

The described techniques relate to improved methods, systems, devices, and apparatuses that support random access coverage extension in wireless communications. Various described techniques provide for aggregating random access requests across two or more physical random access channel (PRACH) occasions. In cases where channel quality between a base station and a UE is relatively poor, the likelihood of successful receipt of a random access request at a base station may be reduced. Thus, techniques for enhancing the likelihood of successful receipt of such random access requests may help to improve efficiency of wireless communications systems. For example, a base station may configure PRACH resources that include a number of PRACH occasions, and some or all of the configured PRACH occasions may be available for aggregation of random access requests. A user equipment (UE) may aggregate a random access request across two or more PRACH occasions and may transmit the aggregated random access request via two or more PRACH occasions. Such aggregated random access requests may provide increased likelihood of successful reception at the base station for UEs located in areas with relatively poor coverage.

In some cases, a UE may determine to transmit a non-aggregated or aggregated random access request based on channel conditions measured at the UE. In some cases, if a signal strength of a signal received at the UE from the base station (e.g., a synchronization signal block (SSB) transmission) is below a threshold value, the UE may transmit an aggregated random access request that spans two or more PRACH occasions. The two or more PRACH occasions may be contiguous or non-contiguous. In some cases, the random access request may include a sequence or preamble that is transmitted from the UE, and that may be selected from a set of available preambles. In some cases, a first subset of preambles may be configured for aggregated random access requests, and a second subset of preambles may be configured for non-aggregated random access requests. Accordingly, the receiving base station may attempt to detect the first subset of preambles based on aggregated PRACH occasions and attempt to detect the second subset of preambles based on non-aggregated PRACH occasions. In some cases, different PRACH occasions may use different PRACH formats, and an aggregated random access request may span two PRACH occasions that use different formats. Additionally or alternatively, random access coverage extension may be achieved through reduced subcarrier spacing (SCS) for random access requests of certain PRACH occasions.

A method of wireless communication at a UE is described. The method may include receiving, from a base station, PRACH configuration information that indicates a set of PRACH occasions available for aggregation of random access requests and transmitting an aggregated random access request via two or more PRACH occasions of the set of PRACH occasions.

An apparatus for wireless communication at a UE is described. The apparatus may include a processor, memory in electronic communication with the processor, and instructions stored in the memory. The instructions may be executable by the processor to cause the apparatus to receive, from a base station, PRACH configuration information that indicates a set of PRACH occasions available for aggregation of random access requests and transmit an aggregated random access request via two or more PRACH occasions of the set of PRACH occasions.

Another apparatus for wireless communication at a UE is described. The apparatus may include means for receiving, from a base station, PRACH configuration information that indicates a set of PRACH occasions available for aggregation of random access requests and transmitting an aggregated random access request via two or more PRACH occasions of the set of PRACH occasions.

A non-transitory computer-readable medium storing code for wireless communication at a UE is described. The code may include instructions executable by a processor to receive, from a base station, PRACH configuration information that indicates a set of PRACH occasions available for aggregation of random access requests and transmit an aggregated random access request via two or more PRACH occasions of the set of PRACH occasions.

Some examples of the method, apparatuses, and non-transitory computer-readable medium described herein may further include operations, features, means, or instructions for measuring a signal strength of a signal received from the base station and selecting the aggregated random access request for transmission based on the signal strength being below a threshold value. In some examples of the method, apparatuses, and non-transitory computer-readable medium described herein, the signal strength may be a reference signal received power (RSRP) measurement. In some examples of the method, apparatuses, and non-transitory computer-readable medium described herein, the RSRP measurement may be measured from an SSB transmitted by the base station.

In some examples of the method, apparatuses, and non-transitory computer-readable medium described herein, the set of PRACH occasions that are available for aggregation of random access requests include contiguous PRACH occasions. In some examples of the method, apparatuses, and non-transitory computer-readable medium described herein, the set of PRACH occasions that are available for aggregation of random access requests include non-contiguous PRACH occasions.

In some examples of the method, apparatuses, and non-transitory computer-readable medium described herein, the PRACH configuration information further includes PRACH format information, and where a first PRACH occasion of the set of PRACH occasions may have a first PRACH format, and a second PRACH occasion of the set of PRACH occasions may have a second PRACH format.

In some examples of the method, apparatuses, and non-transitory computer-readable medium described herein, the PRACH configuration information further indicates a set of available random access preambles, and where a first subset of the set of available random access preambles are available for aggregated random access requests and a second subset of the set of available random access preambles are available for non-aggregated random access requests, the first subset being non-overlapping with the second subset. In some examples of the method, apparatuses, and non-transitory computer-readable medium described herein, a first subset of the set of PRACH occasions are available for transmission of aggregated random access requests, and a second subset of the set of PRACH occasions are available for transmission of non-aggregated random access requests, the first subset being non-overlapping with the second subset.

In some examples of the method, apparatuses, and non-transitory computer-readable medium described herein, a first subset of the set of PRACH occasions are available for transmission of aggregated random access requests, and a second subset of the set of PRACH occasions are available for transmission of non-aggregated random access requests, the first subset at least partially overlapping with the second subset.

In some examples of the method, apparatuses, and non-transitory computer-readable medium described herein, the receiving further may include operations, features, means, or instructions for receiving a remaining minimum system information (RMSI) transmission from the base station that includes the PRACH configuration information. In some examples of the method, apparatuses, and non-transitory computer-readable medium described herein, the two or more PRACH occasions for transmission of the aggregated random access request map to a same SSB. In some examples of the method, apparatuses, and non-transitory computer-readable medium described herein, the two or more PRACH occasions for transmission of the aggregated random access request span two or more PRACH configuration periods. In some examples of the method, apparatuses, and non-transitory computer-readable medium described herein, the aggregated random access request includes a random access preamble that spans each of the two or more PRACH occasions.

In some examples of the method, apparatuses, and non-transitory computer-readable medium described herein, a subset of the set of PRACH occasions may have a first SCS that may be smaller than a second SCS of other of the set of PRACH occasions. In some examples of the method, apparatuses, and non-transitory computer-readable medium described herein, the first SCS provides a longer symbol duration relative to the second SCS.

A method of wireless communication is described. The method may include receiving, from a base station, PRACH configuration information that indicates a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a coverage extension (CE) random access request, selecting two or more PRACH occasions of the second subset of PRACH occasions for transmission of the CE random access request, and transmitting the CE random access request via the selected two or more PRACH occasions.

An apparatus for wireless communication is described. The apparatus may include a processor, memory in electronic communication with the processor, and instructions stored in the memory. The instructions may be executable by the processor to cause the apparatus to receive, from a base station, PRACH configuration information that indicates a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a coverage extension random access request, select two or more PRACH occasions of the second subset of PRACH occasions for transmission of the CE random access request, and transmit the CE random access request via the selected two or more PRACH occasions.

Another apparatus for wireless communication is described. The apparatus may include means for receiving, from a base station, PRACH configuration information that indicates a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a CE random access request, selecting two or more PRACH occasions of the second subset of PRACH occasions for transmission of the CE random access request, and transmitting the CE random access request via the selected two or more PRACH occasions.

A non-transitory computer-readable medium storing code for wireless communication is described. The code may include instructions executable by a processor to receive, from a base station, PRACH configuration information that indicates a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a CE random access request, select two or more PRACH occasions of the second subset of PRACH occasions for transmission of the CE random access request, and transmit the CE random access request via the selected two or more PRACH occasions.

In some examples of the method, apparatuses, and non-transitory computer-readable medium described herein, the CE random access request transmitted via the second subset of PRACH occasions uses a same random access format as a non-CE random access request transmitted via the first subset of PRACH occasions. In some examples of the method, apparatuses, and non-transitory computer-readable medium described herein, the second SCS provides a longer symbol duration relative to the first SCS.

Some examples of the method, apparatuses, and non-transitory computer-readable medium described herein may further include operations, features, means, or instructions for measuring a signal strength of a signal received from the base station and determining that the CE random access request may be to be transmitted based on the signal strength being below a threshold value. In some examples of the method, apparatuses, and non-transitory computer-readable medium described herein, the signal strength may be a RSRP measurement.

In some examples of the method, apparatuses, and non-transitory computer-readable medium described herein, the PRACH configuration information further includes aggregation information for at least a portion of the second subset of PRACH occasions that are available for transmission of an aggregated random access request that spans at least two PRACH occasions of the portion of the second subset of PRACH occasions. In some examples of the method, apparatuses, and non-transitory computer-readable medium described herein, the selecting further may include operations, features, means, or instructions for selecting the two or more PRACH occasions from the portion of the second subset of PRACH occasions that may be available for transmission of the aggregated random access request and transmitting the aggregated random access request via the selected two or more PRACH occasions.

DETAILED DESCRIPTION

Figure 1:
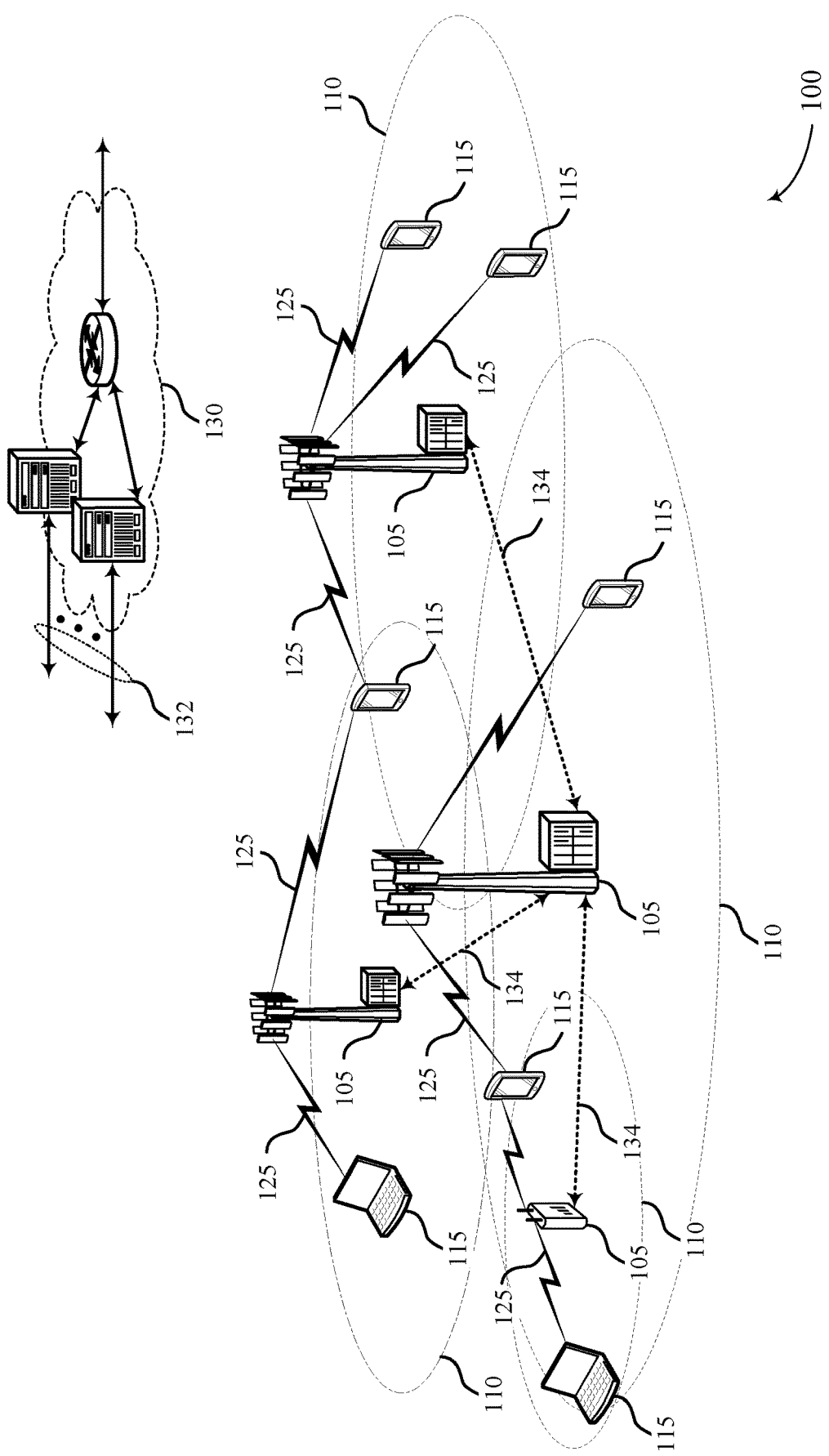
FIG. 1 illustrates an example of a wireless communications system that supports random access coverage extension in wireless communications in accordance with aspects of the present disclosure.

As indicated above, some wireless communications systems may provide resources for random access procedures. For example, the network may use periodic and/or aperiodic time/frequency resources that a user equipment (UE) may utilize to perform random access procedures. Various aspects of the present disclosure provide techniques for aggregating random access requests across two or more physical random access channel (PRACH) occasions. A base station may configure PRACH resources that include a number of PRACH occasions, and some or all of the configured PRACH occasions may be available for aggregation of random access requests. Additionally or alternatively, random access coverage extension may be achieved through reduced subcarrier spacing (SC S) for random access requests of certain PRACH occasions.

In some cases, random access requests may be transmitted according to an open-loop power control scheme in which a first random access request is transmitted at a first power and, if a random access response is not received, a second random access request may be transmitted at a higher power following a backoff period. In cases where a UE is located in an area that has relatively poor coverage and poor channel conditions, or if directional beamforming parameters are mismatched, such repetitions may consume a relatively long period of time and still may not result in a successful transmission and receipt of a random access request. In some cases, if a UE measures a received signal strength of a transmission from a base station (e.g., a synchronization signal block (SSB) transmission) to be below a threshold value, the UE may determine to transmit an aggregated random access request, which may enhance the likelihood of successful receipt of the random access request at the base station. Thus, system efficiency may be enhanced through more efficient random access procedures. Further, power consumption and access time at a UE may be reduced through fewer repeated random access request transmissions in cases where the UE measures a received signal strength that is relatively low.

In cases where aggregated random access requests are configured, a UE may aggregate a random access request across two or more PRACH occasions. The UE may then transmit the aggregated random access request via the two or more PRACH occasions. In some cases, a UE may determine whether to transmit non-aggregated or aggregated random access requests based on channel conditions measured at the UE. In some cases, if a signal strength of a signal received at the UE from the base station (e.g., an SSB transmission) is below a threshold value, the UE may transmit an aggregated random access request that spans two or more PRACH occasions. The two or more PRACH occasions may be contiguous or non-contiguous.

In some cases, the random access request may include a sequence or preamble that is transmitted from the UE, which may be selected from a set of available preambles. In some cases, a first subset of preambles may be configured for aggregated random access requests, and a second subset of preambles may be configured for non-aggregated random access requests. In such cases, the receiving base station may attempt to detect the first subset of preambles based on aggregated PRACH occasions and attempt to detect the second subset of preambles based on non-aggregated PRACH occasions. In some cases, different PRACH occasions may use different PRACH formats, and an aggregated random access request may span two PRACH occasions that use different formats.

Aspects of the disclosure are initially described in the context of wireless communications systems. Various examples of resources for, and transmissions of, aggregated random access requests and SCS changes for random access requests are then described. Aspects of the disclosure are further illustrated by and described with reference to apparatus diagrams, system diagrams, and flowcharts that relate to random access coverage extension in wireless communications.

FIG. 1 illustrates an example of a wireless communications system 100 that supports random access coverage extension in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. UEs 115 and base stations 105 may employ coverage extension techniques for random access requests in accordance with various techniques discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, such MTC devices may be located in areas that have relatively poor channel conditions, such as within a facility that has relatively dense objects that may interfere with wireless transmissions. In such cases, coverage extension techniques, including random access coverage extension techniques such as discussed herein, may provide for enhanced reliability of communications.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions. In such cases, efficient and reliable connection establishment, such as initiated via random access requests, may be important for system operation.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

In some cases, a base station 105 may configure PRACH resources that include a number of PRACH occasions, where some or all of the configured PRACH occasions may be available for aggregation of random access requests. A UE 115 may aggregate a random access request across two or more PRACH occasions and may transmit the aggregated random access request via the two or more PRACH occasions. Such aggregated random access requests may provide increased likelihood of successful reception at the base station 105 for UEs 115 located in areas with relatively poor coverage. Additionally or alternatively, random access coverage extension may be achieved through reduced SCS for random access requests of certain PRACH occasions.

Figure 2:
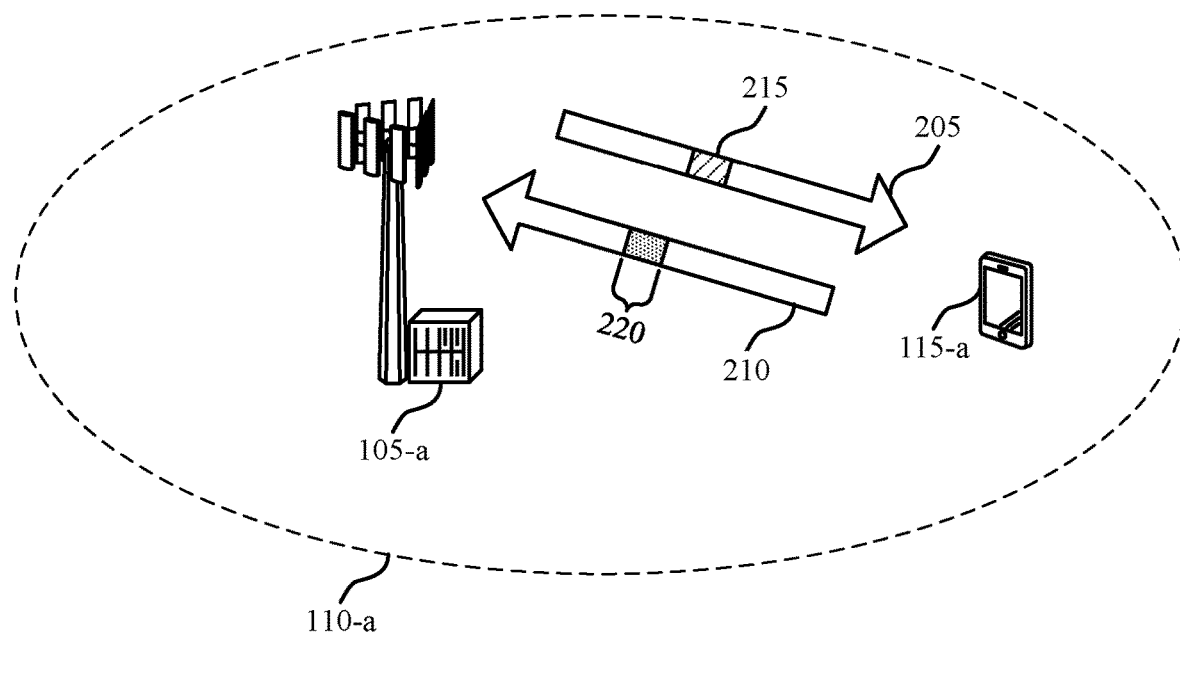
FIG. 2 illustrates an example of a portion of a wireless communications system that supports random access coverage extension in wireless communications in accordance with aspects of the present disclosure.

FIG. 2 illustrates an example of a wireless communications system 200 that supports random access coverage extension in wireless communications in accordance with aspects of the present disclosure. In some examples, wireless communications system 200 may implement aspects of wireless communications system 100. In some examples, the wireless communications system 200 may include a base station 105-a and UE 115-a, which may be examples of the corresponding devices as described with reference to FIG. 1. The UE 115-a may communicate with the base station 105-a within a coverage area 110-a.

In some examples, the base station 105-a may transmit downlink transmissions 205 to the UE 115-a, and the UE 115-a may transmit uplink transmissions 210 to the base station. The downlink transmissions 205 and uplink transmissions 210 may be made via one or more carriers. In some examples, the downlink transmissions 205 and uplink transmissions 210 may be beamformed transmissions using mmW frequencies. As indicated above, the base station 105-a may configure resources for various uplink and downlink transmissions, including a physical downlink control channel (PDCCH), a physical downlink shared channel (PDSCH) transmissions, a physical uplink control channel (PUCCH), a physical uplink shared channel (PUSCH), and a PRACH, among others. The various configurations may be provided to UEs 115 within coverage area 110-a via broadcast transmissions, such as periodic SSB transmissions and remaining minimum system information (RMSI) transmissions, where the SSB or RMSI transmissions may include PRACH configuration 215. The UE 115-a may detect the SSB transmissions, determine the PRACH configuration 215, and identify configured PRACH occasions that are available for transmitting a random access request 220. Random access request 220 may be used for initial system access or, in some cases, for reestablishing a connection following an idle period.

In some cases, the random access request 220 may include a random access preamble that the UE 115-a selects from a set of available random access preambles. The set of available random access preambles may be predefined and may include bit sequences that may be used to identify the UE 115-a in random access transmissions. In some cases, the PRACH configuration 215 may identify a PRACH format that provides a number of symbols and indicates random access preambles that may be used by the UE 115-a. In some NR systems, a short sequence based preamble may be used, in which a number of short sequences are repeated over the number of symbols of a PRACH occasion. In some cases, different PRACH occasions may have different PRACH formats.

As indicated above, in some examples, the UE 115-a may experience relatively poor channel conditions that may reduce the likelihood of the random access request 220 being successfully received at the base station 105-a. For example, the UE 115-a may be in a location that has relatively poor coverage. In examples where the UE 115-a and base station 105-a use beamformed transmissions, during an initial access stage, beamforming gain may be limited because the base station 105-a and UE 115-a have not performed beam refinement procedures. Accordingly, the base station 105-a may use beamforming parameters to receive uplink random access requests 220 over a relatively wide beam in order to reduce PRACH overhead. In such cases, the UE 115-a may experience relatively poor channel conditions due to beam mismatch. Random access coverage extension techniques discussed herein may enhance the likelihood of the base station 105-a successfully receiving the random access request 220 in cases where the UE 115-a experiences relatively poor channel conditions.

In some cases, random access coverage extension may be achieved through aggregation of random access request 220 over two or more PRACH occasions. The base station 105-a may identify that the random access request 220 is aggregated over the two or more PRACH occasions, may combine signals received during each occasion, and may attempt to decode the combined signals. An aggregated random access request may include random access preambles that are concatenated to span PRACH resources of the two or more PRACH occasions. In some cases, an aggregated random access request may also be referred to as an extended random access request or an extended PRACH.

In some cases, the UE 115-a may determine whether to transmit a non-aggregated or an aggregated random access request 220 based on channel conditions measured at the UE 115-a. In some examples, if a signal strength of a signal received at the UE 115-a from the base station 105-a (e.g., an SSB transmission) is below a threshold value, the UE 115-a may transmit an aggregated random access request 220 that spans two or more PRACH occasions. The two or more PRACH occasions may be contiguous or non-contiguous. In some cases, a first subset of preambles may be configured (e.g., via an indication in PRACH configuration 215) for aggregated random access requests, and a second subset of preambles may be configured for non-aggregated random access requests. In such cases, the base station 105-a may attempt to detect the first subset of preambles based on aggregated PRACH occasions and attempt to detect the second subset of preambles based on non-aggregated PRACH occasions. In some cases, different PRACH occasions may use different PRACH formats, and the aggregated random access request 220 may span two PRACH occasions that use different formats.

Additionally or alternatively, random access coverage extension may be achieved through reduced SCS of certain PRACH occasions for the random access request 220. In such cases a first SCS, such as a 15 kHz or 30 kHz SCS may be configured for a first subset of PRACH occasions, and a second SCS that is smaller than the first SCS (e.g., a reduced SCS), such as a 7.5 kHz or 15 kHz SCS, may be configured for a second subset of PRACH occasions. In some examples, the UE 115-a may determine to use coverage extension for random access request 220 and may select a PRACH occasion from the second subset of PRACH occasions. The reduced SCS, for a given PRACH format, may result in the random access request 220 spanning a longer time duration. In some cases, this may allow the base station 105-a to collect more power from the random access request 220 and thereby enhance the likelihood that the base station 105-a will successfully receive and decode the random access request 220. In some cases, the reduced SCS may be used in conjunction with aggregated random access requests 220.

Figure 3:
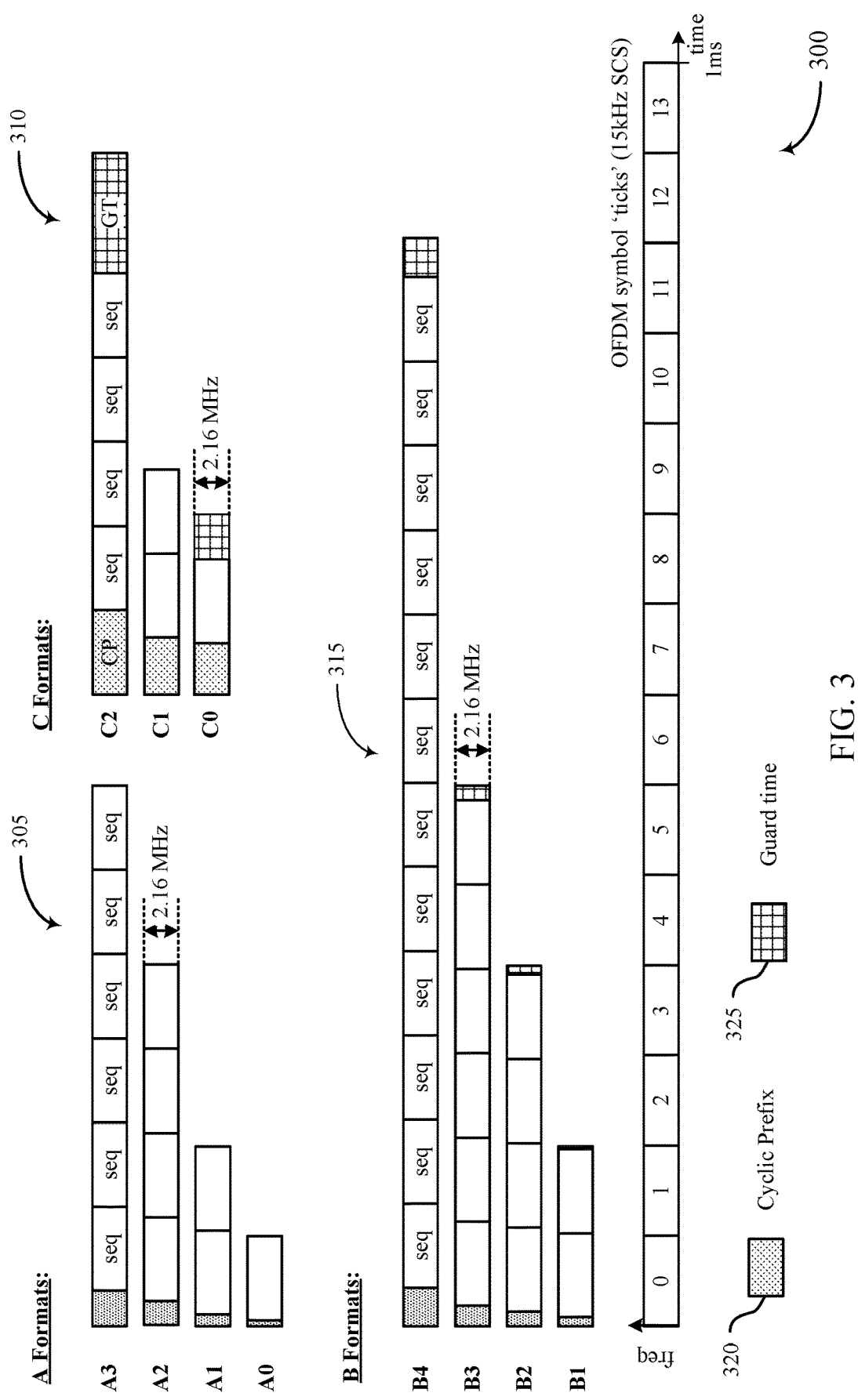
FIG. 3 illustrates an example of PRACH formats that support random access coverage extension in wireless communications in accordance with aspects of the present disclosure.

FIG. 3 illustrates an example of PRACH formats 300 that support random access coverage extension in wireless communications in accordance with aspects of the present disclosure. In some examples, PRACH formats 300 may implement aspects of wireless communications systems 100 or 200. For example, a number of different formats may be available for selection of a PRACH format 300 for one or more PRACH occasions. In some cases, the PRACH formats 300 may include a number of A formats 305 (formats A0 through A3), a number of B formats 310 (format B1 through B4), and a number of C formats 315. Different PRACH formats 300 may have different cyclic prefix 320 durations, and different guard times 325 (e.g., which may include guard times equal to zero).

The PRACH formats 300 may include short sequence based preambles, in which a same short sequence is repeated in each symbol of the PRACH occasion following the cyclic prefix 320. In some cases, the short sequences may have a length of 139 elements in the Zadoff-Chu sequence and, based on a 15 kHz SCS, may each have a duration of 66.67 µs and have a bandwidth of 2.16 MHz. For other SCSs, such as 30 kHz, 60 kHz, or 120 kHz SCS, the preamble formats may be scaled according to the SCS, resulting in a shorter-duration sequence relative to the 15 kHz SCS. For example, 1, 2, 4, 6 or 12 OFDM symbols may be configured for a PRACH occasion, with cyclic prefix 320 aggregated at a beginning of the burst, and with or without guard time 325 at the end. In cases where one or more data channels are configured to have a same numerology as the PRACH preambles, the PRACH preambles may be aligned with OFDM symbol boundaries of the one or more data channels. As indicated above, in some cases a UE may aggregate random access requests to span two or more PRACH occasions, as will be discussed in more detail with reference to FIG. 4. Additionally or alternatively, different PRACH occasions may be configured with smaller SCS that may be selected for random access coverage extension, as will be discussed in more detail with reference to FIG. 5.

Figure 4:
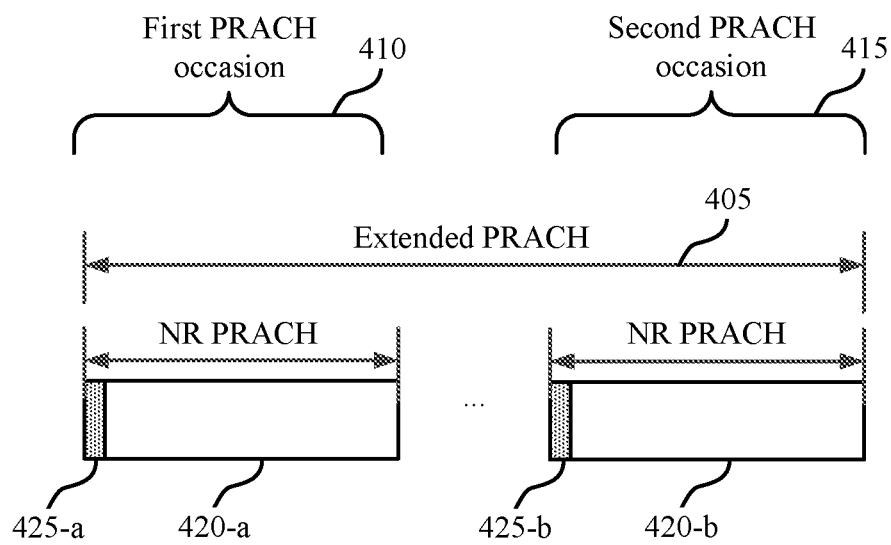
FIG. 4 illustrates an example of an aggregated random access request that supports random access coverage extension in wireless communications in accordance with aspects of the present disclosure.

FIG. 4 illustrates an example of an aggregated random access request 400 that supports random access coverage extension in wireless communications in accordance with aspects of the present disclosure. In some examples, aggregated random access request 400 may implement aspects of wireless communications system 100 or 200. For example, an extended PRACH occasion 405 may be configured to span a first PRACH occasion 410 and a second PRACH occasion 415. Within each PRACH occasion 410 and 415, a random access preamble may be transmitted in accordance with the PRACH format associated with the PRACH occasion, where the PRACH format may include one or more sort sequences 420, a cyclic prefix 425, and, in some cases, a guard time.

The concatenation or aggregation of the first PRACH occasion 410 and second PRACH occasion 415 may form an extended PRACH occasion 405. While FIG. 4 illustrates two PRACH occasions, other examples may include three or more PRACH occasions. The first PRACH occasion 410 and the second PRACH occasion 415 may be contiguous or non-contiguous PRACH occasions. For example, the first PRACH occasion 410 may be located in a first slot, the second PRACH occasion 415 may be located in a second slot, and the PRACH occasions 410 and 415 may be aggregated to form an extended PRACH occasion 405. In other cases, the first PRACH occasion 410 may immediately precede the second PRACH occasion 415 (and thus the second PRACH occasion 415 may be immediately subsequent to the first PRACH occasion 410) in a same slot. In some cases, the first PRACH occasion 410 and the second PRACH occasion 415 may each have a same PRACH format (e.g., each may have PRACH format A3). In other cases, the first PRACH occasion 410 and the second PRACH occasion 415 may have different PRACH formats. For example, the first PRACH occasion 410 may have PRACH format A3 and the second PRACH occasion 415 may have PRACH format B3, although any combination of PRACH formats may be used.

In some cases, the preamble sequences used for extended random access requests (e.g., via random access request aggregation, reduced SCS, or combinations thereof) may be a subset of a set of available preamble sequences. For example, a base station may configure a first subset of preambles in the PRACH occasions for enhanced coverage support through extended random access requests, and may configure a second subset of preambles for non-enhanced coverage support. Additionally or alternatively, a first subset of PRACH occasions may be configured for extended random access requests and a second subset of PRACH occasions may be configured for regular, non-extended random access requests. In some cases, the first subset of PRACH occasions may not overlap with the second subset of PRACH occasions, and a base station may identify extended random access requests based on the subset of PRACH occasions used for transmission. In other cases, the first subset of PRACH occasions may at least partially overlap with the second subset of PRACH occasions.

As such, different preambles may be configured for extended versus non-extended random access requests, where the base station may attempt to detect extended random access requests based on aggregated PRACH occasions, and may attempt to detect the non-extended random access request based on a single PRACH occasion. In some cases, the preamble sequences and the PRACH occasions for extended random access requests may be indicated by the base station in RMSI (e.g., a mask in time/preambles to allow the aggregation).

In some cases, multiple aggregated PRACH occasions may map to a same SSB for random access request extension. In some cases, one SSB, which may correspond to one PRACH configuration period, may be configured to span multiple PRACH occasions, where two or more of the multiple PRACH occasions may be configured for extended random access requests. For example, one SSB may map to eight PRACH occasions, and two or more of the eight PRACH occasions may be configured for extended random access requests. In other cases, two SSBs may map to a single PRACH occasion, and the two or more PRACH occasions 410 and 415 for transmission of the aggregated random access request may span two or more PRACH configuration periods. In some cases, a cyclic mapping of SSBs to PRACH occasions may be provided during a time period, where the time period may span one or more PRACH configuration periods and the cyclic mapping may be used to effectively realize the same SSB mapping to multiple RACH occasions.

When the UE selects the random access preamble in the extended format, the UE may repeat the preamble to span all concatenated PRACH occasions accordingly. As indicated above, the UE may select an extended or non-extended PRACH format based on channel conditions. For example, the UE may measure a reference signal received power (RSRP) of a reference signal in an SSB received from the base station. If the measured RSRP is below a threshold value, the UE may select an extended PRACH format, and if the measured RSRP is at or above the threshold value, the UE may select a non-extended or non-aggregated PRACH format.

Figure 5:
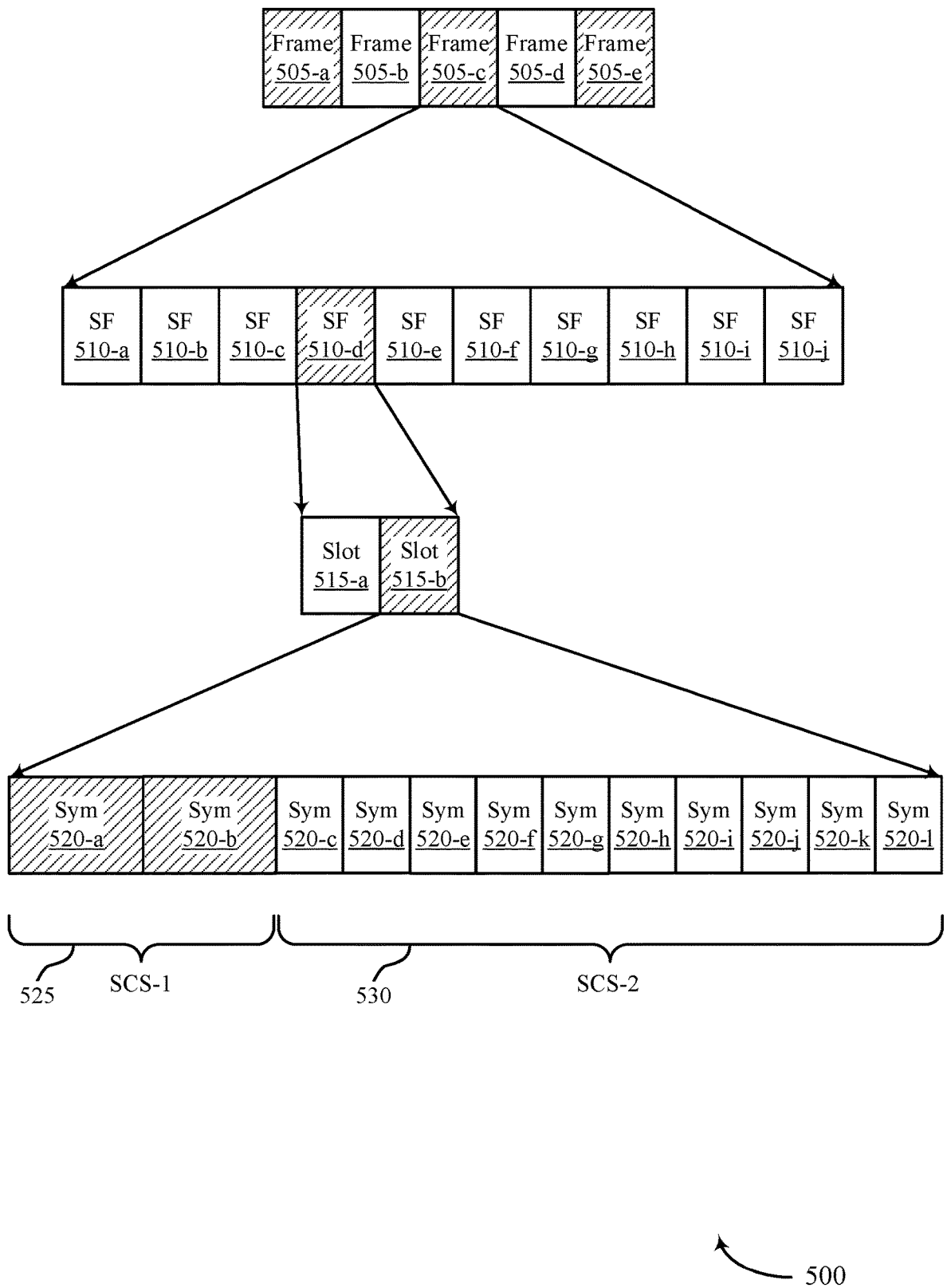
FIG. 5 illustrates an example of a resource configuration that supports random access coverage extension in wireless communications in accordance with aspects of the present disclosure.

FIG. 5 illustrates an example of a resource configuration 500 that supports random access coverage extension in wireless communications in accordance with aspects of the present disclosure. In some examples, resource configuration 500 may implement aspects of wireless communications system 100 or 200.

In some aspects, resource configuration 500 may support configuring of time-frequency regions for PRACH occasions. In some cases, PRACH occasions may be configured to be periodic in time. For example, PRACH occasions may be configured in radio frame 505-*a*, 505-*c*, and 505-*e* that may correspond to radio frames 505 that are alternating in time. It is to be understood that other periodicities may be configured, and this example is for purposes of discussion and illustration only. In some cases, the plurality of radio frames 505 may each include a plurality of subframes 510, each subframe 510 including a plurality of slots 515, and each slot 515 including a plurality of symbols 520. In one example, the first two symbols 520-*a* and 520-*b* of a second slot 515-*b* of a fourth subframe 510-*d* may be configured as a PRACH occasion. A timing pattern may be provided that indicates a repeating pattern for the PRACH occasion for a PRACH configuration period. As indicated above, in one example of resource configuration 500, the timing pattern may be a periodic pattern where the PRACH occasion occurs within every other radio frame 505 (e.g., during radio frames 505-*a*, 505-*c*, and 505-*d*). However, in other examples the PRACH occasions may occur according to an aperiodic schedule.

In some cases, one or more PRACH occasions may be configured for an extended random access request using a reduced SCS. In one example, a reduced SCS or a first SCS 525 (e.g., 30 kHz) may be configured for the PRACH occasion (e.g., symbols 520-*a* and 520-*b*) and a second SCS 530 (e.g., 60 kHz) may be configured for the remainder of the slot 515-*b*. In such cases, the random access request transmitted via the first symbol 520-*a* and second symbol 520-*b* (e.g., using the first SCS 525) may have a time duration that is greater than the other symbols 520 that use the second SCS 530. In some cases, a base station may configure certain PRACH occasions with the first SCS 525 and may configure other PRACH occasions with the second SCS 530. Accordingly, a UE may select the PRACH occasion for transmission of a random access request based on channel conditions at the UE.

In some NR systems, PRACH occasions may be configured with 7.5 kHz SCS, 15 kHz SCS, or 30 kHz SCS in frequency range 1 (FR1), which may correspond to non-mmW frequencies, and PRACH occasions may be configured with 15 kHz SCS, 30 kHz SCS, 60 kHz SCS, or 120 kHz SCS in frequency range 2 (FR2), which may correspond to mmW frequencies. A base station receiving the random access request transmitted with the reduced SCS may have more time during which to collect energy for each resource element of the random access request, which may increase the likelihood of successfully decoding the random access request. In some cases, the reduced SCS PRACH occasions may be aggregated, as discussed above.

Figure 6:
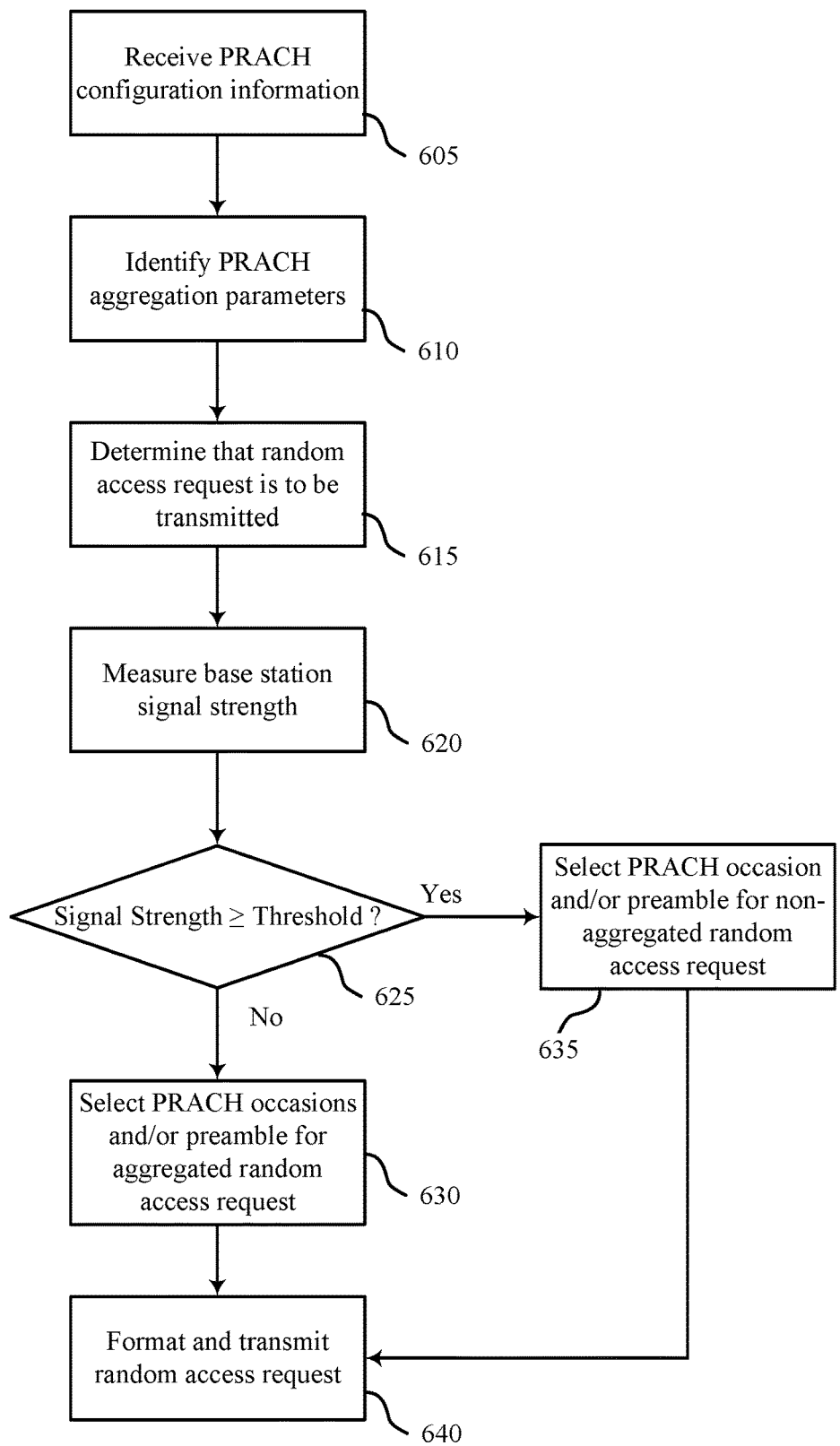
FIG. 6 illustrates an example of a process that supports random access coverage extension in wireless communications in accordance with aspects of the present disclosure.

FIG. 6 illustrates an example of a process 600 that supports random access coverage extension in wireless communications in accordance with aspects of the present disclosure. In some examples, process 600 may implement aspects of wireless communications system 100 or 200. As indicated above, in some cases a UE may transmit extended random access requests, which may include aggregated random access requests that span multiple PRACH occasions or may include random access requests transmitted at a smaller SCS. The example of FIG. 6 discusses aggregated random access requests, although the techniques may also be applied to random access requests transmitted at a smaller SCS.

In one example, at 605, the UE may receive PRACH configuration information. In some cases, PRACH configuration may be received via RMSI from a base station. In some examples, the PRACH configuration information may indicate a set of available random access preambles, where a first subset of the set of available random access preambles may be available for aggregated random access requests and a second subset of the set of available random access preambles may be available for non-aggregated random access requests, where the first subset and the second subset may be overlapping or non-overlapping. In some cases, the PRACH configuration information may indicate that the first subset of a plurality of PRACH occasions is available for transmission of aggregated random access requests, and the second subset of the plurality of PRACH occasions is available for transmission of non-aggregated random access requests. In the case of overlapping subsets of PRACH occasions, random access preambles may be used to differentiate aggregated versus non-aggregated random access requests.

At 610, the UE may identify PRACH aggregation parameters. In some cases, the aggregation parameters may include a number of PRACH sequences that are to be concatenated to span multiple PRACH occasions. In some examples, the PRACH aggregation parameters may include different PRACH formats for different PRACH occasions. Further, in some cases, the PRACH aggregation parameters may include an indication of a signal strength threshold value (e.g., RSRP threshold value) that may be used to determine whether to transmit an aggregated or non-aggregated random access request.

At 615, the UE may determine to transmit a random access request. Such a determination may be made during initial system access, when the UE establishes a connection with the base station. In some cases, the UE may determine to transmit the random access request based on a handover command as part of a handover from a prior base station to the base station that provided the PRACH configuration information. In some examples, the UE may be in idle mode and may determine to transmit the random access request based on a paging message received from the base station.

At 620, the UE may measure a base station signal strength. In some cases, the UE may measure an RSRP of a reference signal transmitted by the base station. In some cases, the reference signal may be transmitted in an SSB that is detected at the UE.

At 625, the UE may determine whether the measured signal strength meets or exceeds a threshold value. In some cases, the threshold value may be provided by the base station as part of the PRACH configuration information. In other cases, the threshold value may be preconfigured. The threshold value may be associated with a signal strength at which it becomes less likely that a random access request from the UE will be successfully received at the base station in absence of an extended random access request.

If the signal strength is below the threshold value, the UE may, at 630, select two or more PRACH occasions and/or a random access preamble for an aggregated random access request. As indicated above, the two or more PRACH occasions for aggregated random access requests may be indicated in the PRACH configuration information received from the base station. In some cases, the PRACH occasions may be contiguous or non-contiguous. In some cases, the PRACH occasions may have the same or different PRACH formats.

If the signal strength is at or above the threshold value, the UE may, at 635, select one PRACH occasions and/or a random access preamble for a non-aggregated random access request.

At 640, the UE may format and transmit the random access request. The formatting may include concatenating the random access preambles across two or more PRACH occasions when the aggregated random access request is transmitted. Additionally or alternatively, the formatting may include formatting the random access preambles in one PRACH occasion when the non-aggregated random access request is transmitted.

Figure 7:
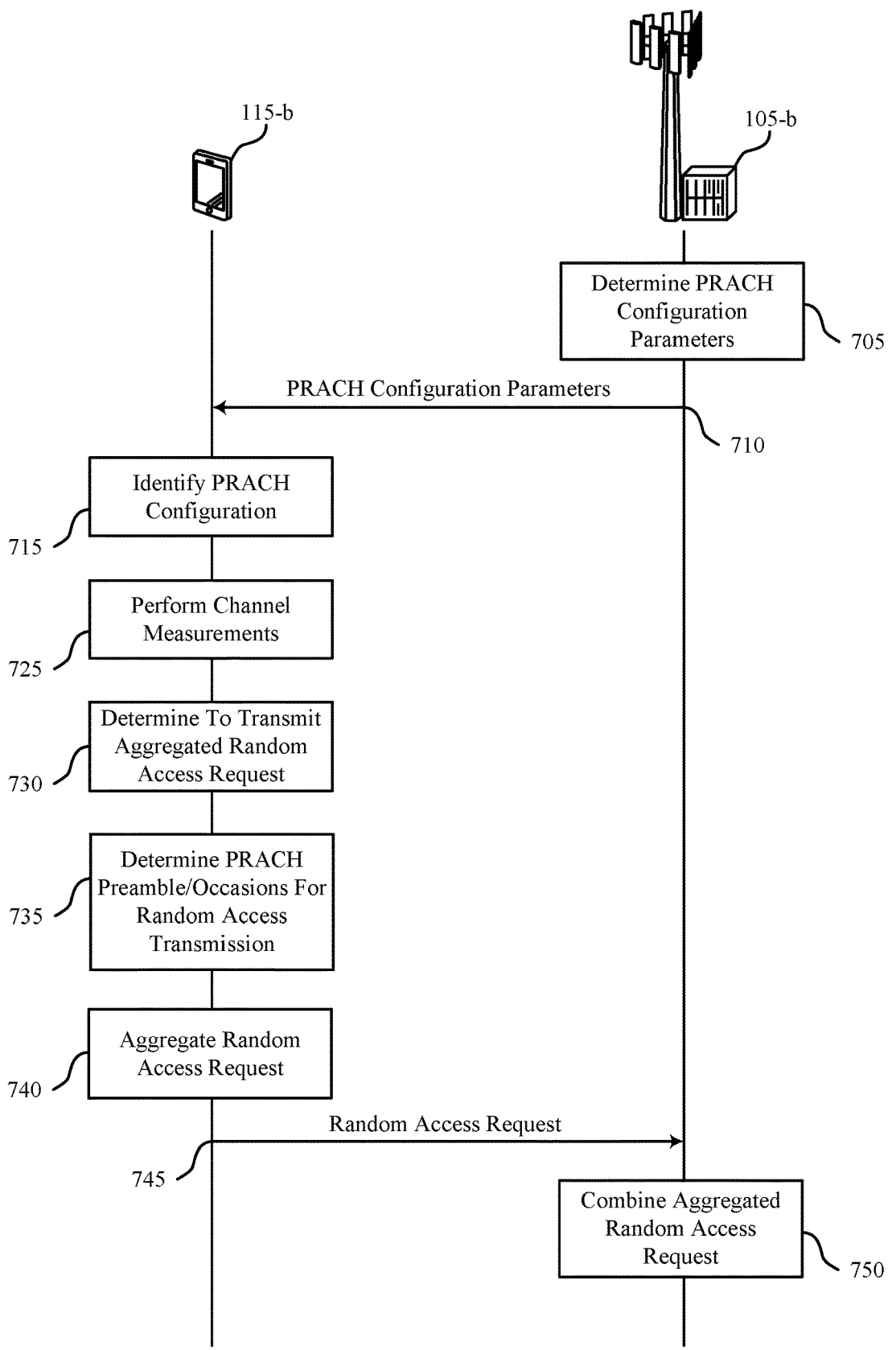
FIG. 7 illustrates an example of a process flow that supports random access coverage extension in wireless communications in accordance with aspects of the present disclosure.

FIG. 7 illustrates an example of a process flow 700 that supports random access coverage extension in wireless communications in accordance with aspects of the present disclosure. In some examples, process flow 700 may implement aspects of wireless communications system 100 or 200. Process flow 700 may include UE 115-b and base station 105-b, which may be examples of the corresponding devices described with reference to FIGS. 1 and 2.

In the following description of the process flow 700, the operations between UE 115-b and base station 105-b may be transmitted in a different order than the order shown, or the operations performed by base station 105-b and UE 115-b may be performed in different orders or at different times. Certain operations may also be left out of the process flow 700, or other operations may be added to the process flow 700. It is to be understood that while base station 105-b and UE 115-b are shown performing a number of the operations of process flow 700, any wireless device may perform the operations shown.

At 705, the base station 105-b may determine PRACH configuration parameters for one or more PRACH occasions. In some cases, the PRACH configuration parameters may include a number of PRACH occasions, a PRACH format for the PRACH occasions, aggregation parameters for two or more PRACH occasions, one or more SCSs for the PRACH occasions, or combinations thereof.

At 710, the base station 105-b may transmit the PRACH configuration parameters to the UE 115-b. In some cases, some or all of the PRACH configuration parameters may be provided in RMSI that is received at the UE 115-b. In some examples, the PRACH configuration parameters may be transmitted via an SSB including one or more reference signals or synchronization signals, such as a primary synchronization signal (PSS) or a secondary synchronization signal (SSS). In some cases, the PRACH configuration parameters may be indicated in a table or via index values that are mapped to various PRACH configurations.

At 715, the UE 115-b may identify the PRACH configuration indicated by the base station 105-b. In some cases, the PRACH configuration may be identified based on the PRACH configuration parameters provided.

At 725, the UE 115-b may perform channel measurements. In some cases, the channel measurements may include a received signal strength measurement or an RSRP measurement. In some cases, the channel measurements may be RSRP measurements from a reference signal transmitted in an SSB.

At 730, the UE 115-b may determine to transmit an aggregated random access request. In some cases, the determination may be made based on the channel measurements. In some cases, if a channel measurement is below a threshold value the UE may determine to transmit the aggregated random access request, and if the channel measurement is at or above the threshold the UE may determine to transmit a non-aggregated random access request.

At 735, the UE 115-b may determine a preamble and PRACH occasions for the random access transmission. In some cases, the PRACH occasions may be indicated PRACH occasions from the PRACH configuration (e.g., that are available for aggregated random access requests). In some cases, the PRACH occasions may be contiguous or non-contiguous PRACH occasions. In some cases, the PRACH occasions may span two or more PRACH configuration periods. The preamble may be selected, in some cases, based on different subsets of preambles that are to be used for aggregated versus non-aggregated random access requests.

At 740, the UE 115-b may aggregate the random access request. As indicated above, the random access request may be aggregated across two or more PRACH occasions. In some cases, the random access request may be aggregated by repeating a random access preamble sequence across each of the symbols in the two or more PRACH occasions.

At 745, the UE 115-b may transmit the aggregated random access request to the base station 105-b via the two or more PRACH occasions.

At 750, the base station 105-b may combine the aggregated random access request. In some cases, the base station 105-b may combine signals received in each of the two or more PRACH occasions in a soft-combining buffer in which received energy in each of the PRACH occasions is accumulated and used for attempting to decode the random access request.

Figure 8:
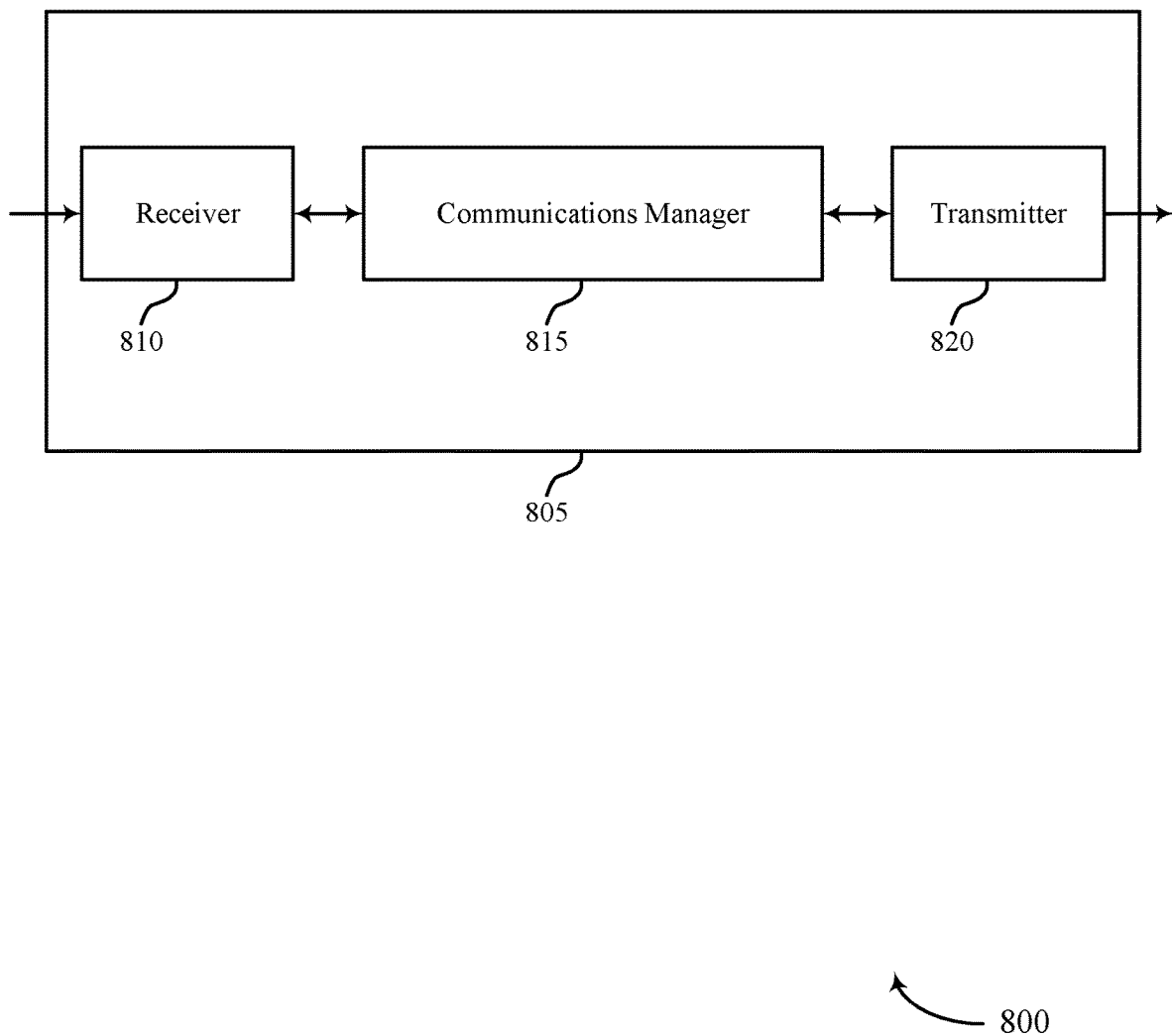
FIGS. 8 and 9 show block diagrams of devices that support random access coverage extension in wireless communications in accordance with aspects of the present disclosure.

FIG. 8 shows a block diagram 800 of a device 805 that supports random access coverage extension in wireless communications in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to random access coverage extension in wireless communications, etc.). Information may be passed on to other components of the device 805. The receiver 810 may be an example of aspects of the transceiver 1120 described with reference to FIG. 11. The receiver 810 may utilize a single antenna or a set of antennas.

In some cases, the communications manager 815 may receive, from a base station, PRACH configuration information that indicates a set of PRACH occasions available for aggregation of random access requests and transmit an aggregated random access request via two or more PRACH occasions of the set of PRACH occasions.

In some cases, additionally or alternatively, the communications manager 815 may also receive, from a base station, PRACH configuration information that indicates a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a coverage extension (CE) random access request, select two or more PRACH occasions of the second subset of PRACH occasions for transmission of the CE random access request, and transmit the CE random access request via the selected two or more PRACH occasions. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
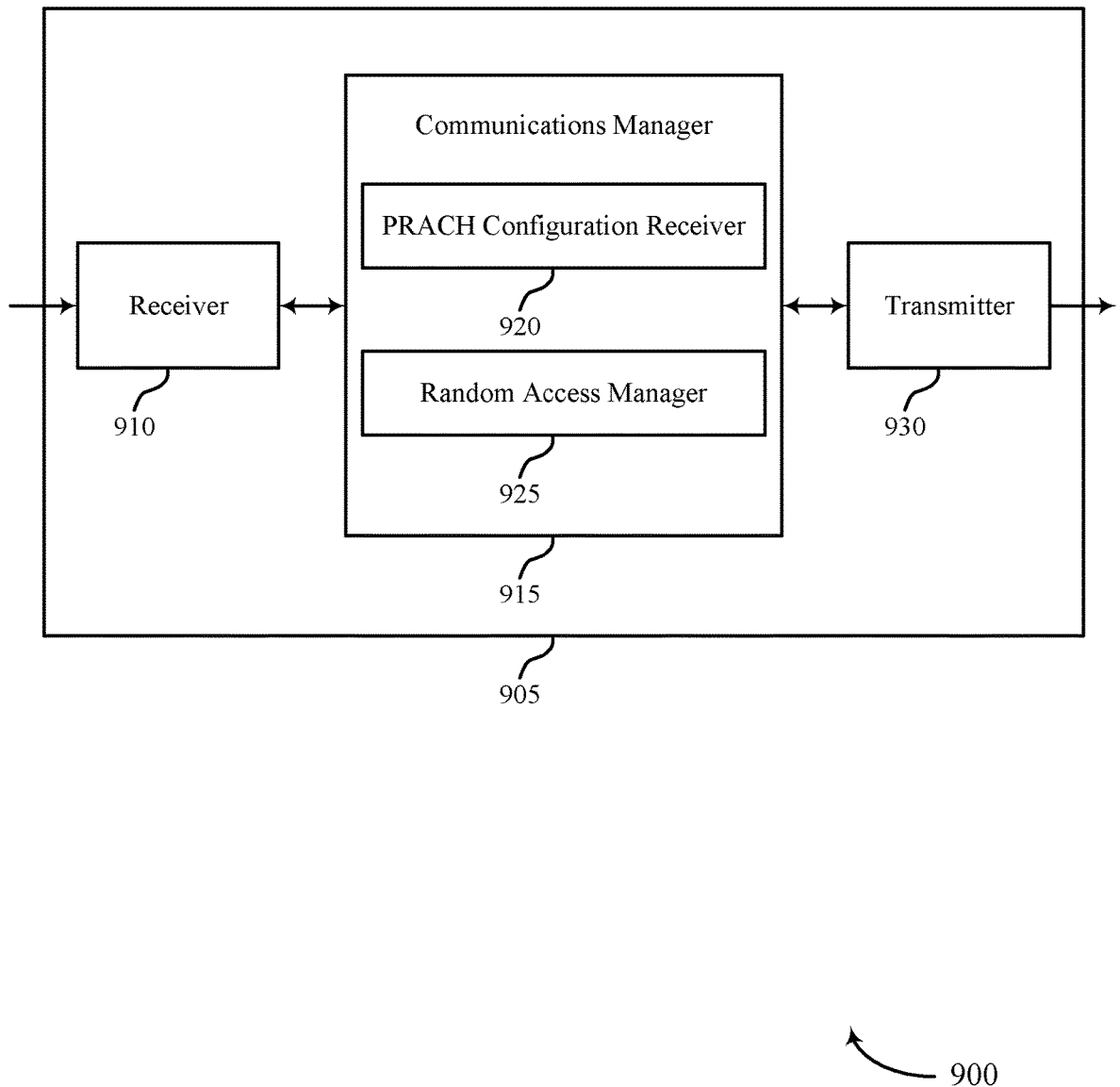

FIG. 9 shows a block diagram 900 of a device 905 that supports random access coverage extension in wireless communications in accordance with aspects of the present disclosure. The device 905 may be an example of aspects of a device 805 or a UE 115 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to random access coverage extension in wireless communications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a PRACH configuration manager 920 and a random access manager 925. The communications manager 915 may be an example of aspects of the communications manager 1110 described herein.

The PRACH configuration manager 920 may receive, from a base station, PRACH configuration information that indicates a set of PRACH occasions available for aggregation of random access requests. In some cases, the PRACH configuration manager 920 may receive, from a base station, PRACH configuration information that indicates a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a CE random access request. In some examples, the PRACH configuration manager 920 may select two or more PRACH occasions of the second subset of PRACH occasions for transmission of the CE random access request.

The random access manager 925 may transmit an aggregated random access request via two or more PRACH occasions of the set of PRACH occasions. In some cases, the random access manager 925 may transmit the CE random access request via the selected two or more PRACH occasions.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
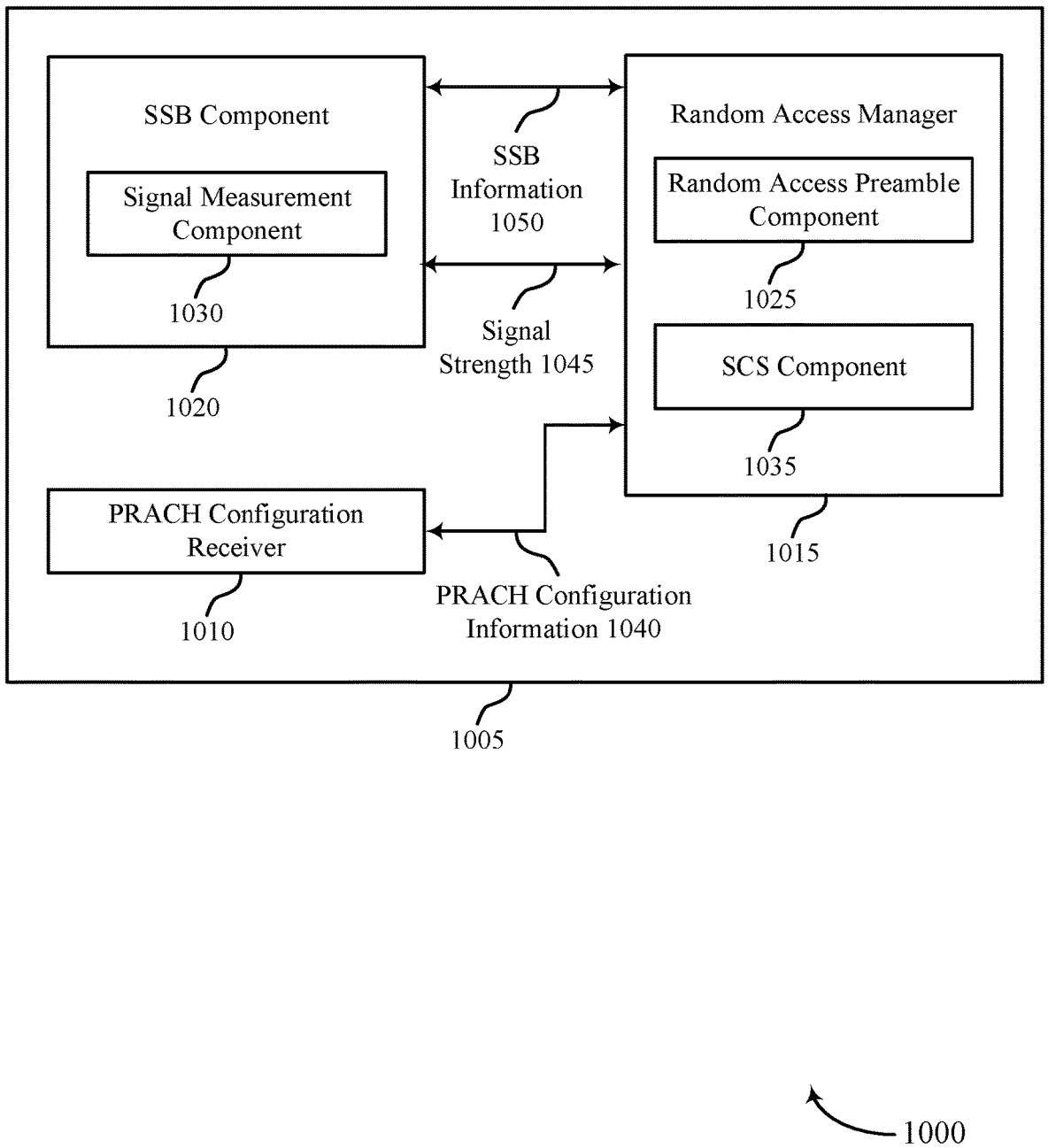
FIG. 10 shows a block diagram of a device that supports random access coverage extension in wireless communications in accordance with aspects of the present disclosure.

FIG. 10 shows a block diagram 1000 of a communications manager 1005 that supports random access coverage extension in wireless communications in accordance with aspects of the present disclosure. The communications manager 1005 may be an example of aspects of a communications manager 815, a communications manager 915, or a communications manager 1110 described herein. The communications manager 1005 may include a PRACH configuration receiver 1010, a random access manager 1015, an SSB component 1020. Additionally, the random access manager 1015 may include a random access preamble component 1025 and an SCS component 1035, while the SSB component 1020 may include a signal measurement component 1030. Each of these modules may communicate, directly or indirectly, with one another (e.g., via one or more buses).

The PRACH configuration receiver 1010 may receive, from a base station, PRACH configuration information 1040 that indicates a set of PRACH occasions available for aggregation of random access requests. In some examples, the PRACH configuration receiver 1010 may receive an RMSI transmission from the base station that includes the PRACH configuration information 1040. In some examples, the PRACH configuration information 1040 may indicate a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a CE random access request. In some examples, aggregated random access requests and non-aggregated random access requests in an overlapping portion of the first subset and second subset may be differentiated based on a different set of preambles available for aggregated random access requests and non-aggregated random access requests.

In some cases, the set of PRACH occasions that are available for aggregation of random access requests include contiguous PRACH occasions. In other cases, the set of PRACH occasions that are available for aggregation of random access requests include non-contiguous PRACH occasions. In some cases, the PRACH configuration information 1040 further includes PRACH format information, and where a first PRACH occasion of the set of PRACH occasions has a first PRACH format, and a second PRACH occasion of the set of PRACH occasions has a second PRACH format. In some cases, a first subset of the set of PRACH occasions are available for transmission of aggregated random access requests, and a second subset of the set of PRACH occasions are available for transmission of non-aggregated random access requests, the first subset being non-overlapping with the second subset.

In some cases, a first subset of the set of PRACH occasions are available for transmission of aggregated random access requests, and a second subset of the set of PRACH occasions are available for transmission of non-aggregated random access requests, the first subset at least partially overlapping with the second subset. In some cases, the PRACH configuration information 1040 further includes aggregation information for at least a portion of the second subset of PRACH occasions that are available for transmission of an aggregated random access request that spans at least two PRACH occasions of the portion of the second subset of PRACH occasions. After receiving the PRACH configuration information 1040, the PRACH configuration receiver 1010 may transmit the PRACH configuration information 1040 to random access manager 1015.

The SSB component 1020 may monitor for and decode SSB transmissions. In some cases, SSB component 1020 may transmit SSB information 1050 to random access manager 1015. The signal measurement component 1030 may measure a signal strength 1045 of a signal received from the base station. In some cases, the signal strength 1045 may be an RSRP measurement. In some cases, the RSRP measurement may be measured from an SSB transmitted by the base station. In some examples, SSB component 1020 may transmit the signal strength 1045 to the random access manager 1015.

The random access manager 1015 may transmit an aggregated random access request via two or more PRACH occasions of the set of PRACH occasions. In some examples, the random access manager 1015 may select the two or more PRACH occasions from the portion of the second subset of PRACH occasions that are available for transmission of the aggregated random access request (e.g., based on the PRACH configuration information 1040). In some examples, the random access manager 1015 may select two or more PRACH occasions of the second subset of PRACH occasions for transmission of the CE random access request. In some cases, the two or more PRACH occasions for transmission of the aggregated random access request span two or more PRACH configuration periods. In some examples, the random access manager 1015 may transmit the aggregated random access request via the selected two or more PRACH occasions. In some examples, the aggregated random access request may be selected for transmission based on the signal strength 1045 being below a threshold value. In some examples, the CE random access request may be transmitted based on the signal strength 1045 being below a threshold value.

In some cases, the two or more PRACH occasions for transmission of the aggregated random access request map to an SSB (e.g., indicated in SSB information 1050). In some examples, the random access manager 1015 may transmit the CE random access request via the selected two or more PRACH occasions with a smaller SCS. In some cases, the CE random access request transmitted via the second subset of PRACH occasions uses a same random access format as a non-CE random access request transmitted via the first subset of PRACH occasions.

The random access preamble component 1025 may select a preamble for the random access request. In some cases, the PRACH configuration information 1040 may further indicate a set of available random access preambles, and where a first subset of the set of available random access preambles are available for aggregated random access requests and a second subset of the set of available random access preambles are available for non-aggregated random access requests, the first subset being non-overlapping with the second subset. In some cases, the aggregated random access request includes a random access preamble that spans each of the two or more PRACH occasions.

The SCS component 1035 may identify a SCS for the random access request. In some cases, a subset of the set of PRACH occasions have a first SCS that is smaller than a second SCS of other of the set of PRACH occasions. In some cases, the first SCS provides a longer symbol duration relative to the second SCS. In some cases, the second SCS provides a longer symbol duration relative to the first SCS.

Figure 11:
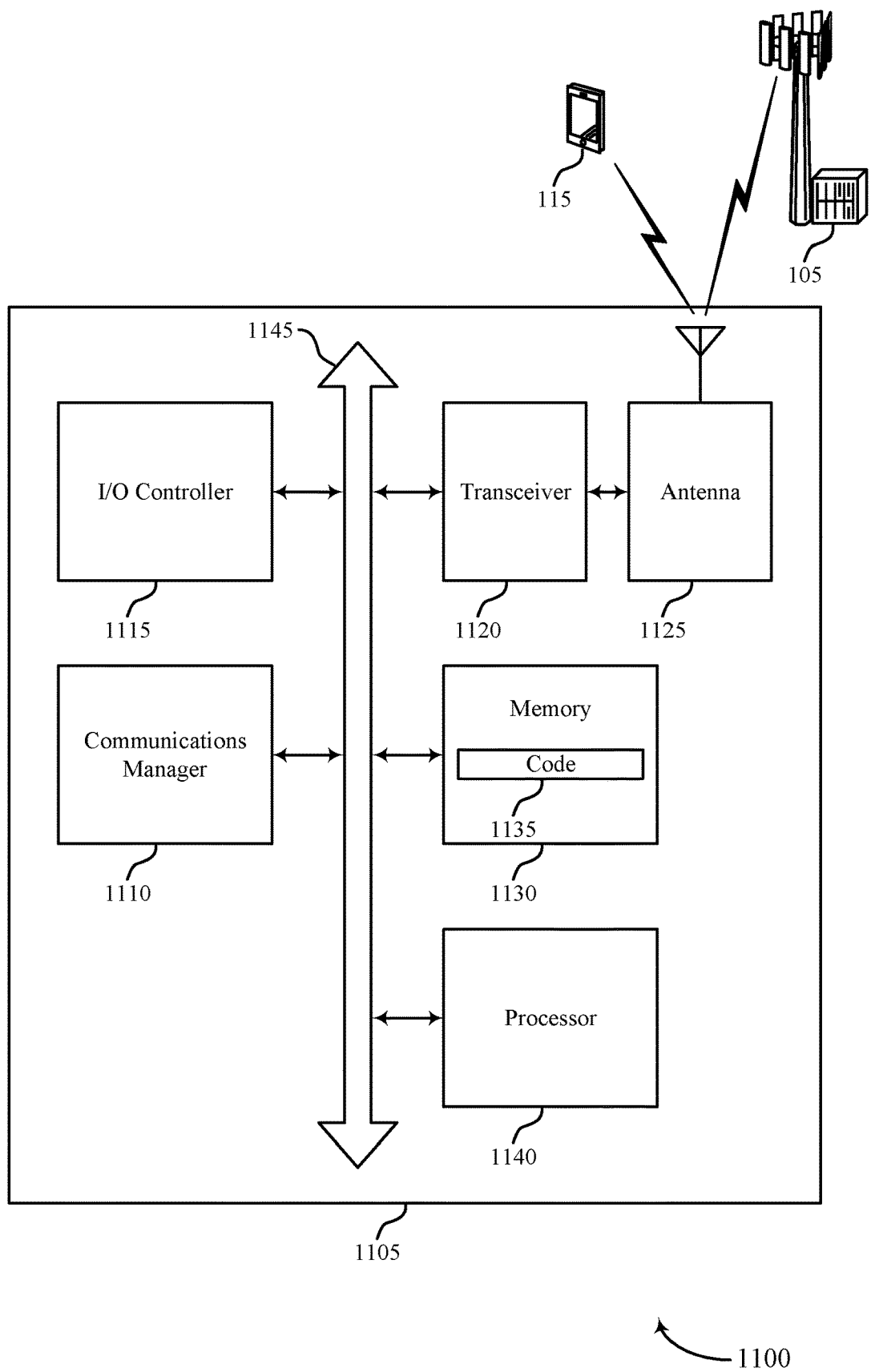
FIG. 11 shows a diagram of a system including a device that supports random access coverage extension in wireless communications in accordance with aspects of the present disclosure.

FIG. 11 shows a diagram of a system 1100 including a device 1105 that supports random access coverage extension in wireless communications in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, PRACH configuration information that indicates a set of PRACH occasions available for aggregation of random access requests and transmit an aggregated random access request via two or more PRACH occasions of the set of PRACH occasions. The communications manager 1110 may also receive, from a base station, PRACH configuration information that indicates a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a CE random access request, select two or more PRACH occasions of the second subset of PRACH occasions for transmission of the CE random access request, and transmit the CE random access request via the selected two or more PRACH occasions.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting random access coverage extension in wireless communications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
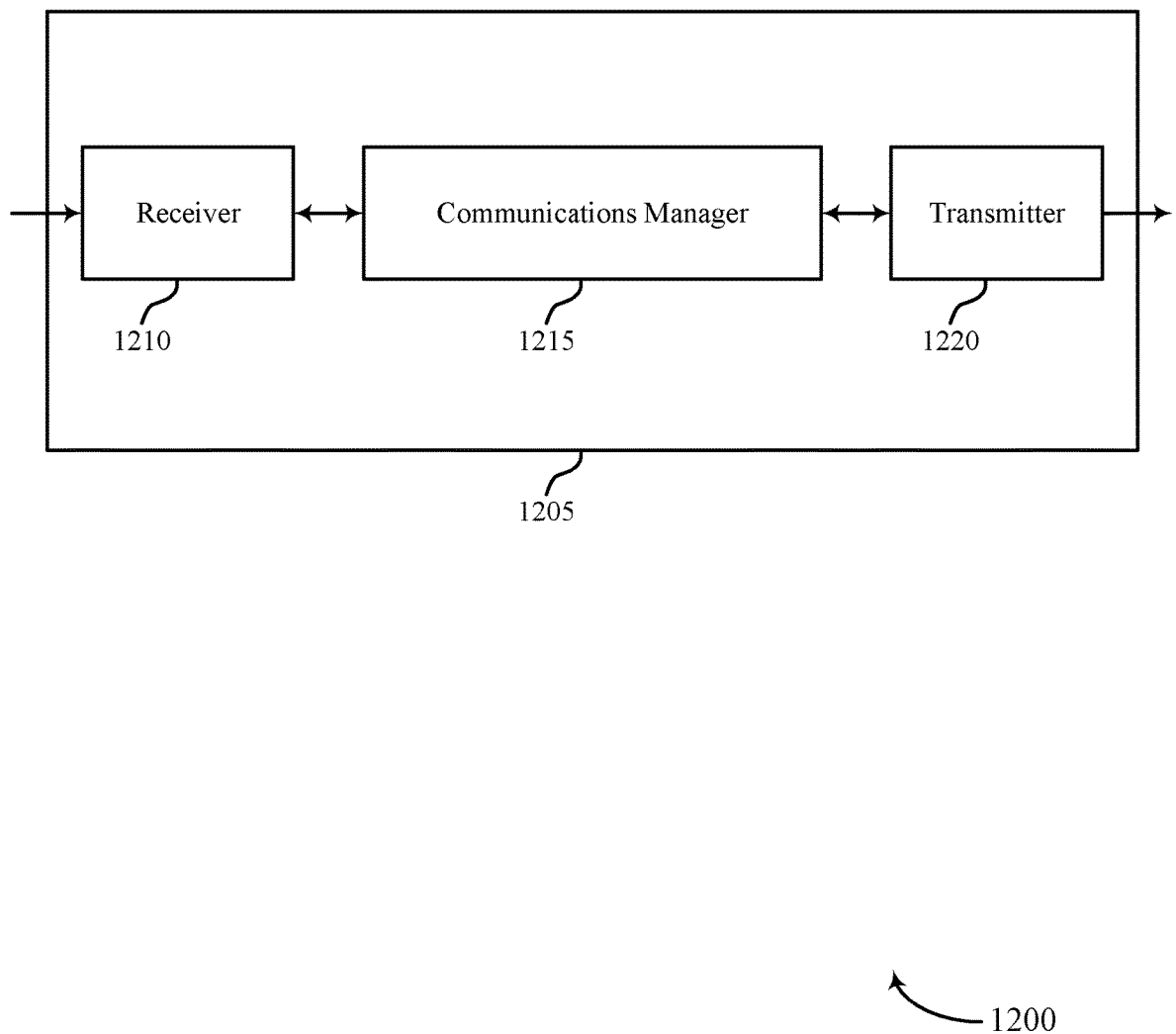
FIGS. 12 and 13 show block diagrams of devices that support random access coverage extension in wireless communications in accordance with aspects of the present disclosure.

FIG. 12 shows a block diagram 1200 of a device 1205 that supports random access coverage extension in wireless communications in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to random access coverage extension in wireless communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, PRACH configuration information that indicates a set of PRACH occasions available for aggregation of random access requests and receive an aggregated random access request via two or more PRACH occasions of the set of PRACH occasions. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
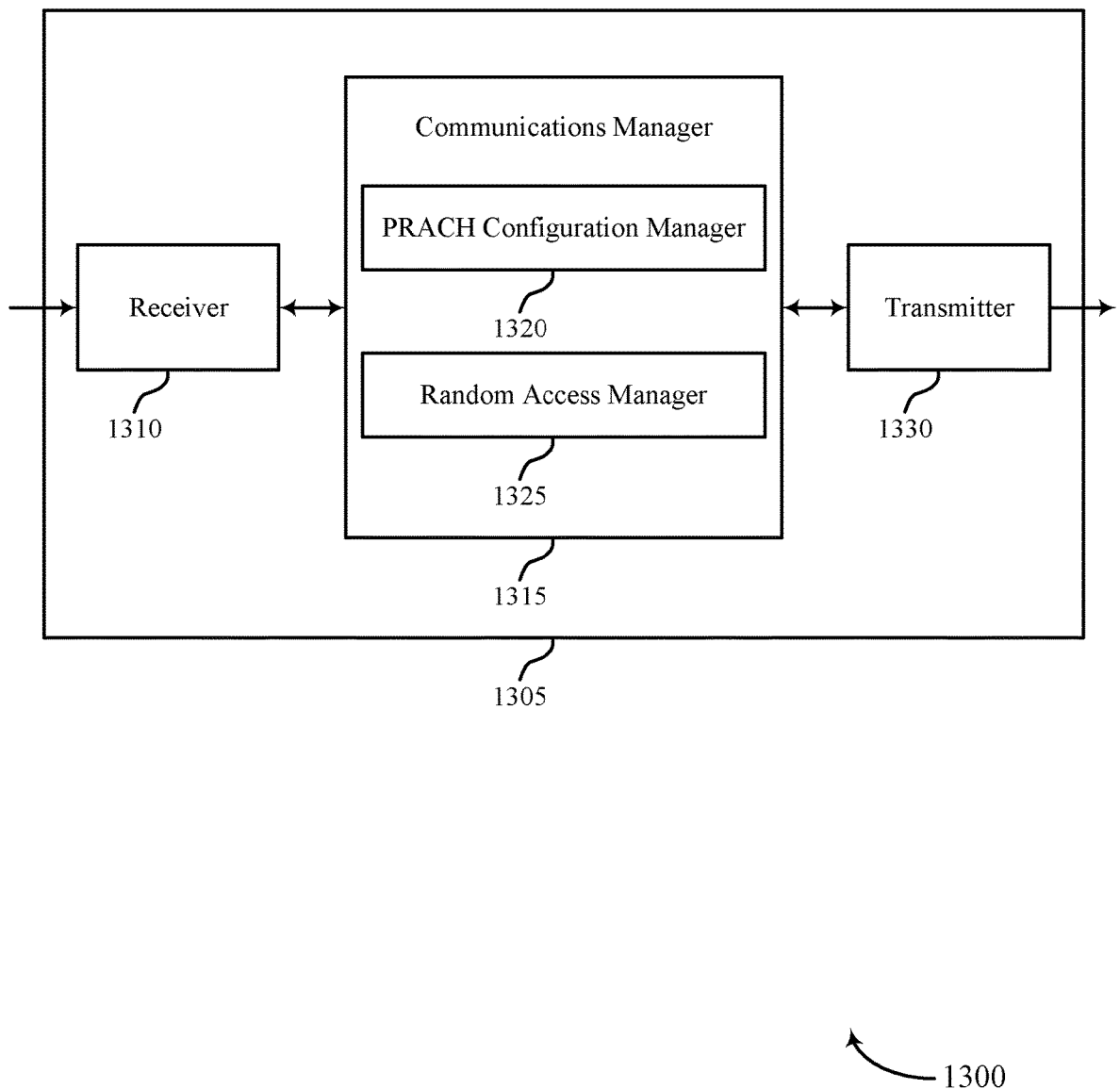

FIG. 13 shows a block diagram 1300 of a device 1305 that supports random access coverage extension in wireless communications in accordance with aspects of the present disclosure. The device 1305 may be an example of aspects of a device 1205 or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to random access coverage extension in wireless communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a PRACH configuration manager 1320 and a random access manager 1325. The communications manager 1315 may be an example of aspects of the communications manager 1510 described herein.

The PRACH configuration manager 1320 may transmit, to a UE, PRACH configuration information that indicates a set of PRACH occasions available for aggregation of random access requests.

The random access manager 1325 may receive an aggregated random access request via two or more PRACH occasions of the set of PRACH occasions.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
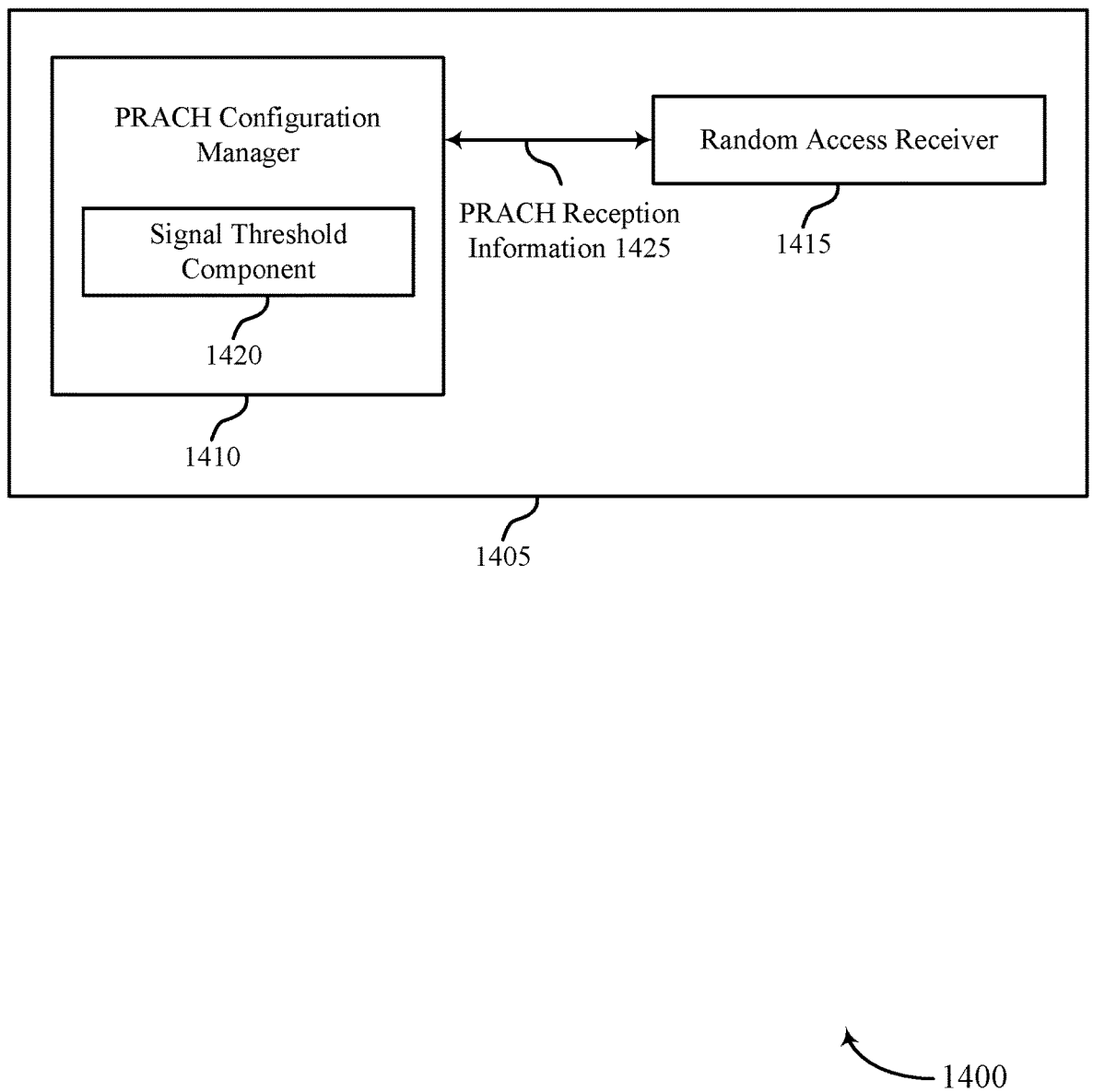
FIG. 14 shows a block diagram of a device that supports random access coverage extension in wireless communications in accordance with aspects of the present disclosure.

FIG. 14 shows a block diagram 1400 of a communications manager 1405 that supports random access coverage extension in wireless communications in accordance with aspects of the present disclosure. The communications manager 1405 may be an example of aspects of a communications manager 1215, a communications manager 1315, or a communications manager 1510 described herein. The communications manager 1405 may include a PRACH configuration manager 1410, a random access receiver 1415. In some cases, PRACH configuration manager 1410 may include a signal threshold component 1420. Each of these modules may communicate, directly or indirectly, with one another (e.g., via one or more buses).

The PRACH configuration manager 1410 may transmit, to a UE, PRACH configuration information that indicates a set of PRACH occasions available for aggregation of random access requests. In some examples, aggregated random access requests and non-aggregated random access requests received in an overlapping portion of the first subset and second subset are differentiated based on a different set of preambles available for aggregated random access requests and non-aggregated random access requests. In some cases, the PRACH configuration information further includes PRACH format information, and where a first PRACH occasion of the set of PRACH occasions has a first PRACH format, and a second PRACH occasion of the set of PRACH occasions has a second PRACH format.

In some cases, the PRACH configuration information further indicates a set of available random access preambles, and where a first subset of the set of available random access preambles are available for aggregated random access requests and a second subset of the set of available random access preambles are available for non-aggregated random access requests, the first subset being non-overlapping with the second subset. In some cases, a first subset of the set of PRACH occasions are available for transmission of aggregated random access requests, and a second subset of the set of PRACH occasions are available for transmission of non-aggregated random access requests, the first subset being non-overlapping with the second subset. In some cases, a first subset of the set of PRACH occasions are available for transmission of aggregated random access requests, and a second subset of the set of PRACH occasions are available for transmission of non-aggregated random access requests, the first subset at least partially overlapping with the second subset.

The signal threshold component 1420 may configure a signal strength measurement threshold for selection of an extended random access request. In some cases, the signal strength is a RSRP measurement. In some cases, the aggregated random access request is selected based on a measured signal strength of a signal received at the UE from the base station being below a threshold value. In some cases, the RSRP measurement is measured from an SSB transmitted by the base station.

In some examples, PRACH configuration manager 1410 may transmit PRACH reception information 1425 to random access receiver 1415, where the PRACH reception information 1425 may include information that may allow random access receiver 1415 to correctly receive a random access request (e.g., an aggregated random access request) and may be based on the PRACH configuration information.

The random access receiver 1415 may receive an aggregated random access request via two or more PRACH occasions of the set of PRACH occasions. In some examples, the random access receiver 1415 may combine signals received in the two or more PRACH occasions to detect the random access request.

Figure 15:
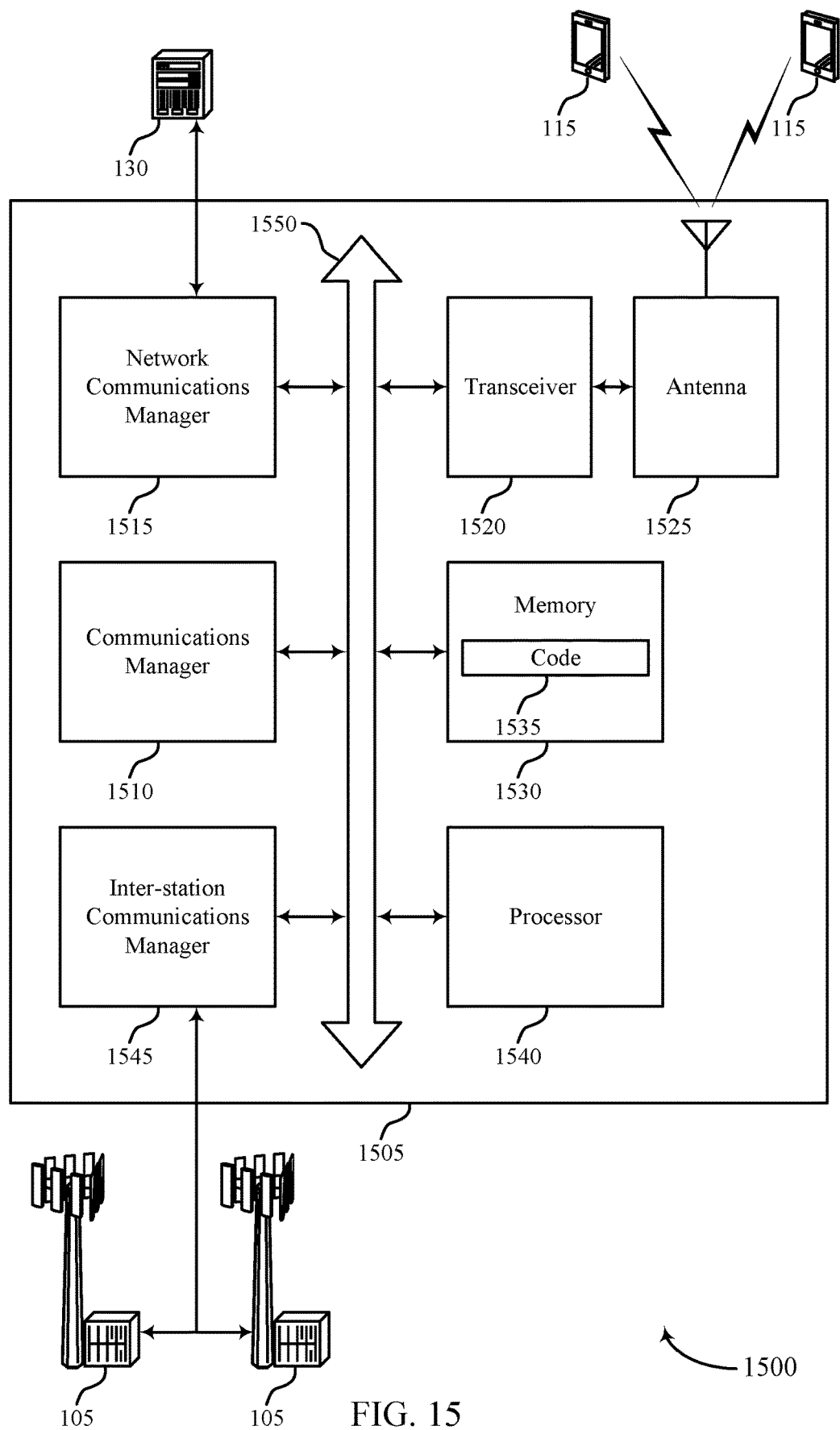
FIG. 15 shows a diagram of a system including a device that supports random access coverage extension in wireless communications in accordance with aspects of the present disclosure.

FIG. 15 shows a diagram of a system 1500 including a device 1505 that supports random access coverage extension in wireless communications in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, PRACH configuration information that indicates a set of PRACH occasions available for aggregation of random access requests and receive an aggregated random access request via two or more PRACH occasions of the set of PRACH occasions.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting random access coverage extension in wireless communications).

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
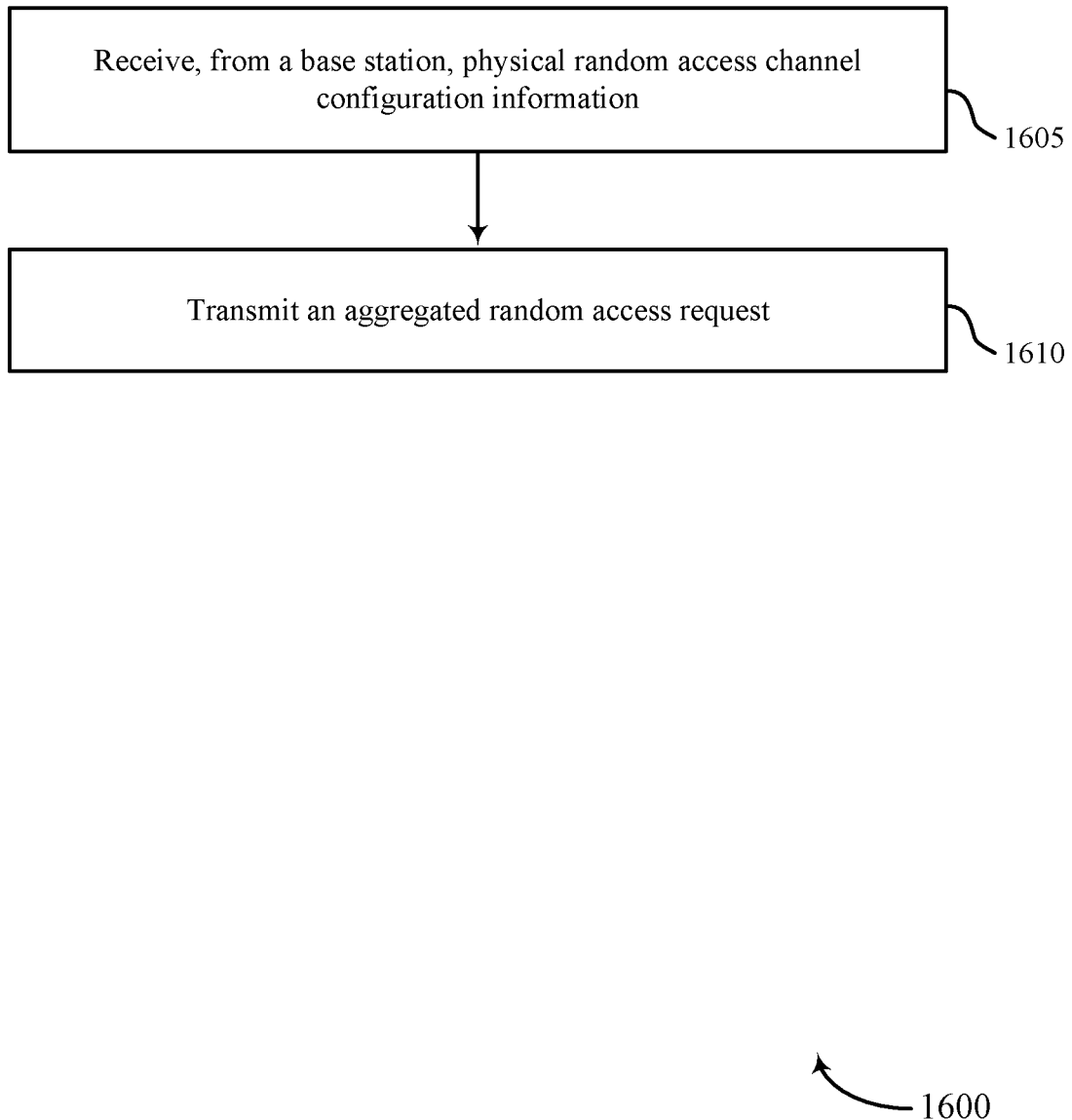
FIGS. 16 through 18 show flowcharts illustrating methods that support random access coverage extension in wireless communications in accordance with aspects of the present disclosure.

FIG. 16 shows a flowchart illustrating a method 1600 that supports random access coverage extension in wireless communications in accordance with aspects of the present disclosure. The operations of method 1600 may be implemented by a UE 115 or its components as described herein. For example, the operations of method 1600 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, PRACH configuration information that indicates a set of PRACH occasions available for aggregation of random access requests. For example, the PRACH configuration information may be received in an RMSI transmission from the base station that includes the PRACH configuration information. In order to receive the RMSI, the UE may identify time-frequency resources over which the RMSI is transmitted, demodulate the transmission over the time-frequency resources, and decode the demodulated transmission to obtain bits that indicate the downlink transmission. The operations of 1605 may be performed according to the methods described herein. In some examples, aspects of the operations of 1605 may be performed by a PRACH configuration manager as described with reference to FIGS. 8 to 11. In some cases, the set of PRACH occasions that are available for aggregation of random access requests include contiguous or non-contiguous PRACH occasions. In some cases, the PRACH configuration information further includes PRACH format information, where a first PRACH occasion of the set of PRACH occasions has a first PRACH format, and a second PRACH occasion of the set of PRACH occasions has a second PRACH format. In some cases, the PRACH configuration information further indicates a set of available random access preambles, and where a first subset of the set of available random access preambles are available for aggregated random access requests and a second subset of the set of available random access preambles are available for non-aggregated random access requests, the first subset being non-overlapping with the second subset.

In some cases, a first subset of the set of PRACH occasions are available for transmission of aggregated random access requests, and a second subset of the set of PRACH occasions are available for transmission of non-aggregated random access requests, the first subset being non-overlapping with the second subset. In some cases, the first subset of the set of PRACH occasions may be at least partially overlapping with the second subset, and aggregated random access requests and non-aggregated random access requests in an overlapping portion of the first subset and second subset may be differentiated based on a different set of preambles available for aggregated random access requests and non-aggregated random access requests. In some cases, a subset of the set of PRACH occasions have a first SCS that is smaller than a second SCS of other of the set of PRACH occasions.

At 1610, the UE may transmit an aggregated random access request via two or more PRACH occasions of the set of PRACH occasions. For example, the UE may transmit the aggregated random access request via two or more PRACH occasions (e.g., chosen from the set of PRACH occasions indicated in the PRACH configuration information), where the two or more PRACH occasions may either be contiguous or non-contiguous. In order to transmit the aggregated random access request, the UE may identify time-frequency resources over which the random access request is to be transmitted, may encode a set of bits containing the random access request, and may modulate the encoded set of bits over the identified time-frequency resources. The operations of 1610 may be performed according to the methods described herein. In some examples, aspects of the operations of 1610 may be performed by a random access manager as described with reference to FIGS. 8 to 11. In some cases, the UE may identify a random access preamble, and aggregate the random access request by repeating the random access preamble across each of the two or more PRACH occasions.

Figure 17:
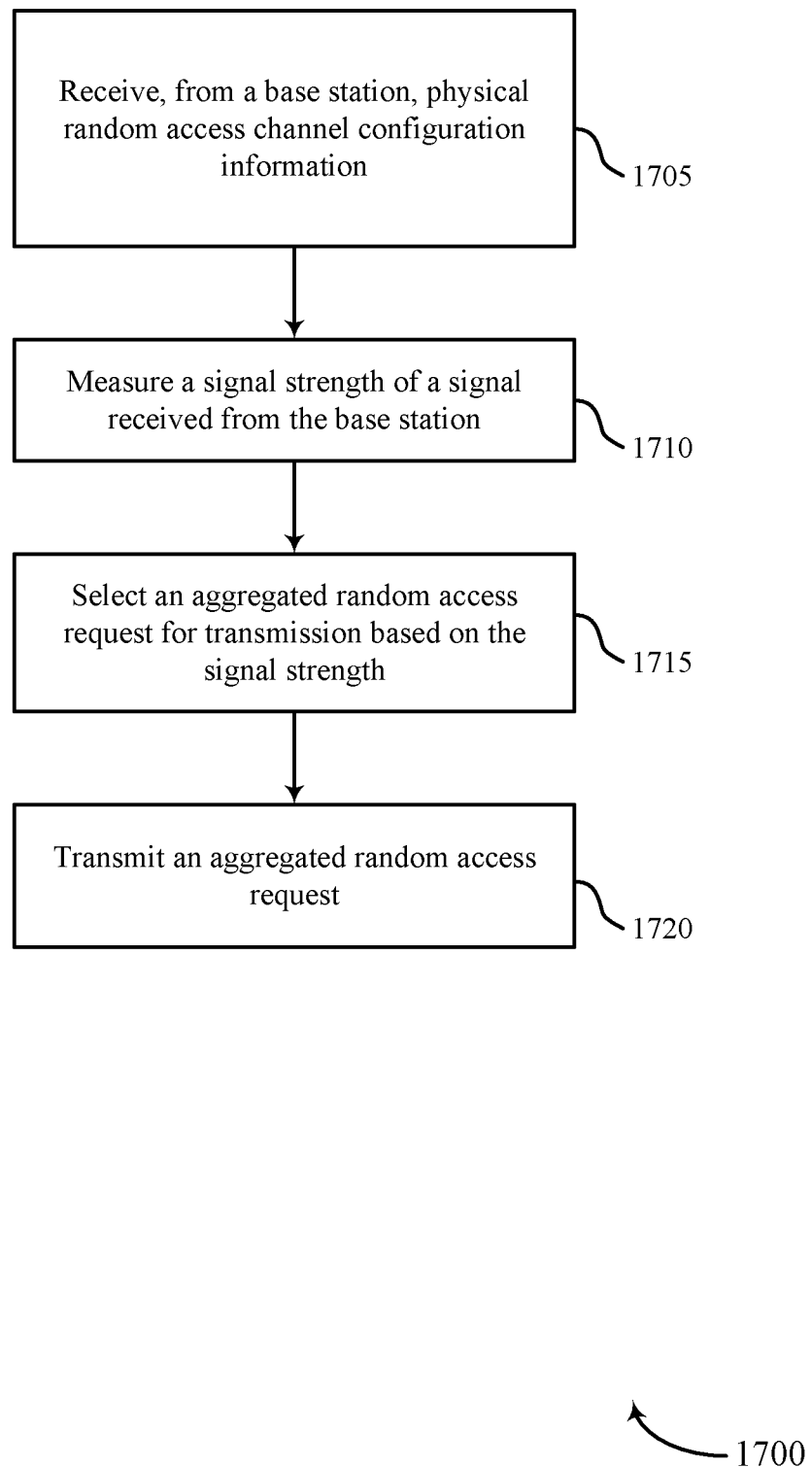

FIG. 17 shows a flowchart illustrating a method 1700 that supports random access coverage extension in wireless communications in accordance with aspects of the present disclosure. The operations of method 1700 may be implemented by a UE 115 or its components as described herein. For example, the operations of method 1700 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, PRACH configuration information that indicates a set of PRACH occasions available for aggregation of random access requests. The operations of 1705 may be performed according to the methods described herein. In some examples, aspects of the operations of 1705 may be performed by a PRACH configuration manager as described with reference to FIGS. 8 to 11. For example, the PRACH configuration information may be received in an RMSI transmission from the base station that includes the PRACH configuration information. In some cases, the PRACH configuration information may be received via an SSB transmitted by the base station. In some cases, the PRACH configuration information may be included in a table of configuration parameters, or may be indicated by one or more index values that are mapped to PRACH configuration parameters. In order to receive the, the UE may identify time-frequency resources over which the PRACH information is transmitted, demodulate the transmission over the time-frequency resources, and decode the demodulated transmission to obtain bits that indicate the downlink transmission.

At 1710, the UE may measure a signal strength of a signal received from the base station. The operations of 1710 may be performed according to the methods described herein. In some examples, aspects of the operations of 1710 may be performed by a signal measurement component as described with reference to FIGS. 8 to 11. In some cases, the signal strength may be a RSRP measurement. In some cases, the RSRP measurement is measured from an SSB transmitted by the base station.

At 1715, the UE may select the aggregated random access request for transmission based on the signal strength being below a threshold value. For example, the UE may select the aggregated random access request based on the PRACH configuration information (e.g., data bits) received from the base station (e.g., the UE may select an aggregated random access request indicated by the base station). The operations of 1725 may be performed according to the methods described herein. In some examples, aspects of the operations of 1725 may be performed by a signal measurement component as described with reference to FIGS. 8 to 11.

At 1720, the UE may transmit the selected aggregated random access request via two or more PRACH occasions of the set of PRACH occasions. For example, the UE may transmit the aggregated random access request via two or more PRACH occasions (e.g., chosen from the set of PRACH occasions indicated in the PRACH configuration information), where the two or more PRACH occasions may either be contiguous or non-contiguous. In order to transmit the aggregated random access request, the UE may identify time-frequency resources over which the random access request is to be transmitted, may encode a set of bits containing the random access request, and may modulate the encoded set of bits over the identified time-frequency resources. The operations of 1730 may be performed according to the methods described herein. In some examples, aspects of the operations of 1730 may be performed by a random access manager as described with reference to FIGS. 8 to 11. In some cases, the UE may identify a random access preamble, and aggregate the random access request by repeating the random access preamble across each of the two or more PRACH occasions.

Figure 18:
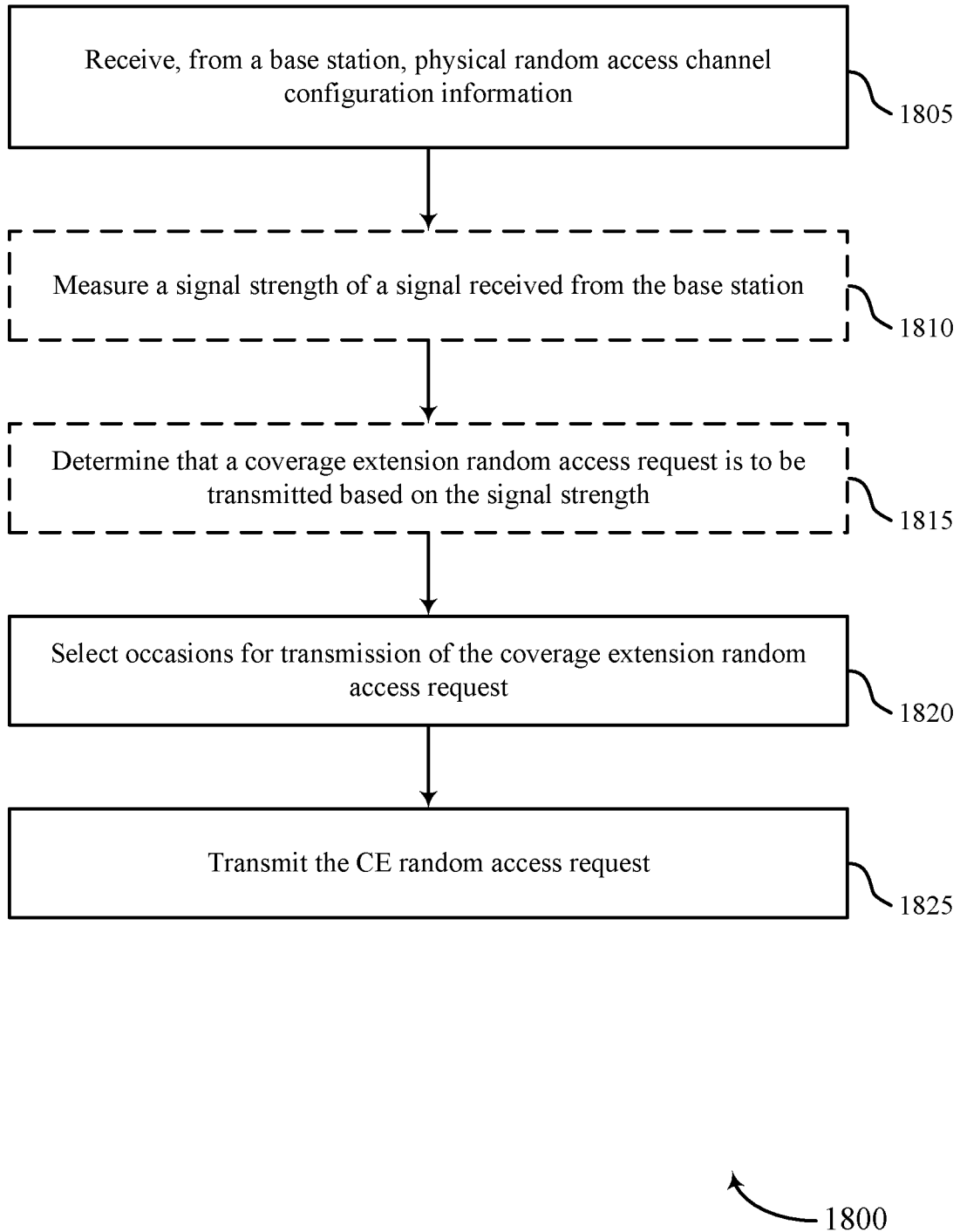

FIG. 18 shows a flowchart illustrating a method 1800 that supports random access coverage extension in wireless communications in accordance with aspects of the present disclosure. The operations of method 1800 may be implemented by a UE 115 or its components as described herein. For example, the operations of method 1800 may be performed by a communications manager as described with reference to FIGS. 8 to 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, PRACH configuration information. For example, the PRACH configuration information may be received in an RMSI transmission from the base station that includes the PRACH configuration information. In some cases, the PRACH configuration information may be received via an SSB transmitted by the base station. In some cases, the PRACH configuration information may be included in a table of configuration parameters, or may be indicated by one or more index values that are mapped to PRACH configuration parameters. In order to receive the, the UE may identify time-frequency resources over which the PRACH information is transmitted, demodulate the transmission over the time-frequency resources, and decode the demodulated transmission to obtain bits that indicate the downlink transmission.

In some cases, the PRACH configuration information may indicate a set of PRACH occasions available for transmission of random access requests, where a first subset of the set of PRACH occasions are configured with a first SCS and a second subset of the set of PRACH occasions are configured with a second SCS that is smaller than the first SCS, and where the second subset of the set of PRACH occasions are available for transmission of a CE random access request. The operations of 1805 may be performed according to the methods described herein. In some examples, aspects of the operations of 1805 may be performed by a PRACH configuration manager as described with reference to FIGS. 8 to 11.

At 1810, the UE may optionally measure a signal strength of a signal received from the base station. The operations of 1810 may be performed according to the methods described herein. In some examples, aspects of the operations of 1810 may be performed by a signal measurement component as described with reference to FIGS. 8 to 11. In some cases, the signal strength is a RSRP measurement. In some cases, the RSRP measurement is measured from a SSB transmitted by the base station.

At 1815, the UE may optionally determine that the CE random access request is to be transmitted based on the signal strength being below a threshold value. The operations of 1815 may be performed according to the methods described herein. In some examples, aspects of the operations of 1815 may be performed by a signal measurement component as described with reference to FIGS. 8 to 11. The CE random access request may be transmitted at the second SCS, and which may provide a longer duration random access request.

At 1820, the UE may select two or more PRACH occasions of the second subset of PRACH occasions for transmission of the CE random access request. For example, the UE may select the aggregated random access request based on the PRACH configuration information (e.g., data bits) received from the base station (e.g., the UE may select an aggregated random access request indicated by the base station). The operations of 1820 may be performed according to the methods described herein. In some examples, aspects of the operations of 1820 may be performed by a PRACH configuration manager as described with reference to FIGS. 8 to 11.

At 1825, the UE may transmit the CE random access request via the selected two or more PRACH occasions. For example, the UE may transmit the aggregated random access request via two or more PRACH occasions (e.g., chosen from the set of PRACH occasions indicated in the PRACH configuration information), where the two or more PRACH occasions may either be contiguous or non-contiguous. In order to transmit the aggregated random access request, the UE may identify time-frequency resources over which the random access request is to be transmitted, may encode a set of bits containing the random access request, and may modulate the encoded set of bits over the identified time-frequency resources. The operations of 1825 may be performed according to the methods described herein. In some examples, aspects of the operations of 1825 may be performed by a random access manager as described with reference to FIGS. 8 to 11. In some cases, the CE random access request transmitted via the second subset of PRACH occasions uses a same random access format as a non-CE random access request transmitted via the first subset of PRACH occasions.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a network entity, physical random access channel (PRACH) configuration information that indicates a plurality of PRACH occasions available for aggregation of random access requests, each of the plurality of PRACH occasions corresponding to respective PRACH resources;
measuring a signal strength of a signal received from the network entity;
selecting, from a set of random access requests including a first subset of aggregated random access requests and a second subset of non-aggregated random access requests, an aggregated random access request for transmission based at least in part on the signal strength being below a threshold value; and
transmitting the aggregated random access request via an aggregated PRACH occasion, the aggregated PRACH occasion comprising two or more different PRACH occasions of the plurality of PRACH occasions that each correspond to respective PRACH resources.

2. The method of claim 1, further comprising:
receiving, via the PRACH configuration information, an indication of the threshold value, wherein selecting the aggregated random access request is based at least in part on receiving the PRACH configuration information.

3. The method of claim 1, wherein the signal strength is a reference signal received power (RSRP) measurement.

4. The method of claim 3, wherein the RSRP measurement is measured from a synchronization signal block (SSB) transmitted by the network entity.

5. The method of claim 1, wherein the plurality of PRACH occasions that are available for aggregation of random access requests comprise contiguous PRACH occasions.

6. The method of claim 1, wherein the plurality of PRACH occasions that are available for aggregation of random access requests comprise non-contiguous PRACH occasions.

7. The method of claim 1, wherein the PRACH configuration information further includes PRACH format information, and wherein a first PRACH occasion of the plurality of PRACH occasions has a first PRACH format, and a second PRACH occasion of the plurality of PRACH occasions has a second PRACH format.

8. The method of claim 1, wherein the PRACH configuration information further indicates a set of available random access preambles, and wherein a first subset of the set of available random access preambles are available for the first subset of aggregated random access requests and a second subset of the set of available random access preambles are available for the second subset of non-aggregated random access requests, the first subset being non-overlapping with the second subset.

9. The method of claim 1, wherein a first subset of the plurality of PRACH occasions are available for transmission of the first subset of aggregated random access requests, and a second subset of the plurality of PRACH occasions are available for transmission of the second subset of non-aggregated random access requests, the first subset of the plurality of PRACH occasions being non-overlapping with the second subset of the plurality of PRACH occasions.

10. The method of claim 1, wherein a first subset of the plurality of PRACH occasions are available for transmission of the first subset of aggregated random access requests, and a second subset of the plurality of PRACH occasions are available for transmission of the second subset of non-aggregated random access requests, the first subset of the plurality of PRACH occasions at least partially overlapping with the second subset of the plurality of PRACH occasions.

11. The method of claim 1, wherein the receiving further comprises:
receiving a remaining minimum system information (RMSI) transmission from the network entity that includes the PRACH configuration information.

12. The method of claim 1, wherein the two or more PRACH occasions for transmission of the aggregated random access request map to a same synchronization signal block (SSB).

13. The method of claim 1, wherein the two or more PRACH occasions for transmission of the aggregated random access request span two or more PRACH configuration periods.

14. The method of claim 1, wherein the aggregated random access request comprises a random access preamble that spans each of the two or more PRACH occasions.

15. The method of claim 1, wherein a subset of the plurality of PRACH occasions have a first subcarrier spacing (SCS) that is smaller than a second SCS of other of the plurality of PRACH occasions.

16. The method of claim 15, wherein the first SCS provides a longer symbol duration relative to the second SCS.

17. An apparatus for wireless communication, comprising:
a processor; and
a memory coupled with the processor, with, instructions stored in the memory, the instructions being executable by the processor to cause the apparatus to:
receive, from a network entity, physical random access channel (PRACH) configuration information that indicates a plurality of PRACH occasions available for aggregation of random access requests, each of the plurality of PRACH occasions corresponding to respective PRACH resources;
measure a signal strength of a signal received from the network entity;
select, from a set of random access requests including a first subset of aggregated random access requests and a second subset of non-aggregated random access requests, an aggregated random access request for transmission based at least in part on the signal strength being below a threshold value; and
transmit the aggregated random access request via two or more PRACH occasions of the plurality of PRACH occasions that each correspond to respective PRACH resources.

18. The apparatus of claim 17, wherein the instructions are further executable by the processor to cause the apparatus to:
receive, via the PRACH configuration information, an indication of the threshold value, wherein selecting the aggregated random access request is based at least in part on receiving the PRACH configuration information.

19. The apparatus of claim 17, wherein the signal strength is a reference signal received power (RSRP) measurement.

20. The apparatus of claim 19, wherein the RSRP measurement is measured from a synchronization signal block (SSB) transmitted by the network entity.

21. The apparatus of claim 17, wherein the plurality of PRACH occasions that are available for aggregation of random access requests comprise contiguous PRACH occasions.

22. The apparatus of claim 17, wherein the plurality of PRACH occasions that are available for aggregation of random access requests comprise non-contiguous PRACH occasions.

23. The apparatus of claim 17, wherein the PRACH configuration information further includes PRACH format information, and wherein a first PRACH occasion of the plurality of PRACH occasions has a first PRACH format, and a second PRACH occasion of the plurality of PRACH occasions has a second PRACH format.

24. The apparatus of claim 17, wherein the PRACH configuration information further indicates a set of available random access preambles, and wherein a first subset of the set of available random access preambles are available for the first subset of aggregated random access requests and a second subset of the set of available random access preambles are available for the second subset of non-aggregated random access requests, the first subset being non-overlapping with the second subset.

25. The apparatus of claim 17, wherein a first subset of the plurality of PRACH occasions are available for transmission of the first subset of aggregated random access requests, and a second subset of the plurality of PRACH occasions are available for transmission of the second subset of non-aggregated random access requests, the first subset of the plurality of PRACH occasions being non-overlapping with the second subset of the plurality of PRACH occasions.

26. The apparatus of claim 17, wherein the instructions are further executable by the processor to cause the apparatus to:

receive a remaining minimum system information (RMSI) transmission from the network entity that includes the PRACH configuration information.

27. The apparatus of claim 17, wherein the two or more PRACH occasions for transmission of the aggregated random access request map to a same synchronization signal block (SSB).

28. The apparatus of claim 17, wherein the two or more PRACH occasions for transmission of the aggregated random access request span two or more PRACH configuration periods.

29. An apparatus for wireless communication, comprising:

means for receiving, from a network entity, physical random access channel (PRACH) configuration information that indicates a plurality of PRACH occasions available for aggregation of random access requests, each of the plurality of PRACH occasions corresponding to respective PRACH resources;

means for measuring a signal strength of a signal received from the network entity;

means for selecting, from a set of random access requests including a first subset of aggregated random access requests and a second subset of non-aggregated random access requests, an aggregated random access request for transmission based at least in part on the signal strength being below a threshold value; and means for transmitting the aggregated random access request via two or more PRACH occasions of the plurality of PRACH occasions that each correspond to respective PRACH resources.

30. A non-transitory computer-readable medium storing code for wireless communication, the code comprising instructions executable by a processor to:

receive, from a network entity, physical random access channel (PRACH) configuration information that indicates a plurality of PRACH occasions available for aggregation of random access requests, each of the plurality of PRACH occasions corresponding to respective PRACH resources;

measure a signal strength of a signal received from the network entity;

select, from a set of random access requests including a first subset of aggregated random access requests and a second subset of non-aggregated random access requests, an aggregated random access request for transmission based at least in part on the signal strength being below a threshold value; and transmit the aggregated random access request via two or more PRACH occasions of the plurality of PRACH occasions that each correspond to respective PRACH resources.

* * * * *